US007010760B2

(12) United States Patent
Arnstein et al.

(10) Patent No.: US 7,010,760 B2
(45) Date of Patent: Mar. 7, 2006

(54) BATCH-BASED METHOD AND TOOL FOR GRAPHICAL MANIPULATION OF WORKFLOWS

(75) Inventors: Lawrence F. Arnstein, Seattle, WA (US); Zheng Li, Bellevue, WA (US); John M. Hill, Tukwila, WA (US); Michael R. Kellen, Bellevue, WA (US); Christophe Poulain, Issaquah, WA (US); Neil A. Fanger, Seattle, WA (US); Kuang Chen, Seattle, WA (US)

(73) Assignee: Teranode Corporation, Seattle, WA (US)

( * ) Notice: Subject to any disclaimer, the term of this patent is extended or adjusted under 35 U.S.C. 154(b) by 12 days.

(21) Appl. No.: 10/799,451

(22) Filed: Mar. 11, 2004

(65) Prior Publication Data

US 2004/0243599 A1    Dec. 2, 2004

Related U.S. Application Data

(60) Provisional application No. 60/543,859, filed on Feb. 11, 2004, provisional application No. 60/505,096, filed on Sep. 22, 2003, provisional application No. 60/493,749, filed on Aug. 8, 2003, provisional application No. 60/454,756, filed on Mar. 14, 2003.

(51) Int. Cl.
*G06F 3/00*     (2006.01)
(52) U.S. Cl. ...................... 715/853; 715/854; 715/855; 345/440; 708/514; 708/424; 718/101
(58) Field of Classification Search ............... 715/853, 715/854, 855; 718/101; 708/514, 424; 345/440
See application file for complete search history.

(56) References Cited

U.S. PATENT DOCUMENTS

| 6,002,396 | A  | * | 12/1999 | Davies ...................... 715/763 |
| 6,288,723 | B1 | * | 9/2001  | Huff et al. .................. 345/644 |
| 6,369,836 | B1 | * | 4/2002  | Larson et al. ............... 715/763 |
| 6,637,473 | B1 | * | 10/2003 | Ganz et al. .................. 141/130 |

OTHER PUBLICATIONS

Kim, Miryung. Migration Prediction in Ubiquitous Computing. Dec. 14th 2001. p. 3.*
Huang, Chia-Yang. Labscape: A Smart Environment for the Cell Biology Laboratory. Sep. 2002. pp. 13-21.*
Sosmath, Multiplication of Matrices, 1999, p. 1-3, www.sosmath.com/matrix1/matrix1.html.*
Hanselman, Duane. The Student Edition of Matlab, 1997. pp. 53,66,68.*
Franza, Bob, "Getting Real at CSI," *Intel Computing and Communication Continuum*, Mar. 2000. URL=http://labscape.cs.washington.edu/AINM.ppt, download date Apr. 26, 2005.

(Continued)

*Primary Examiner*—Kristine Kincaid
*Assistant Examiner*—Ryan F. Pitaro
(74) *Attorney, Agent, or Firm*—Seed IP Law Group PLLC

(57) ABSTRACT

An autofill algorithm provides tools for defining and automatically executing batch based procedures in an adaptive hierarchical workflow environment, and may be suitable for a large variety of applications including laboratory procedure planning, execution, documentation, as wells ad driving robotic apparatus.

27 Claims, 24 Drawing Sheets

OTHER PUBLICATIONS

Arnstein, L., "Invisible Computing in the Biology Laboratory," *The Sixth Annual Workshop on Frontiers in Distributed Information Systems*, Jun. 2000. URL=http://www.cs.washington.edu/homes/larrya/FDIS2K.pdf, download date Apr. 26, 2005.

Slides, *Computer Science & Engineering Colloquium*, Oct. 10, 2000. URL=http://www.cs.washington.edu/homes/larrya/colloquium.pdf, download date Apr. 26, 2005.

"Convergence at the Extremes: Computational Science Meets Networked Sensors," *SuperComputing 2000 Panel*, Nov. 10, 2000. URL=http://www.cs.berkeley.edu/~culler/sc2000-extremes-panel/, download date Apr. 26, 2005.

Arnstein, L., "Labscape: Ubiquitous Computing in the Biology Laboratory," *Lab Automation 2001, Session on Emerging Informatics Technologies*, Jan. 30, 2001. URL=http://www.cs.washington.edu/homes/larrya/LabAutomation2001.pdf, download date Apr. 26, 2005.

Arnstein, L., et al., "Ubiquitous Computing in the Biology Laboratory," *Journal of Lab Automation*, 6(1), Feb. 8, 2001. URL=http://www.cs.washington.edu/homes/larrya/jala.pdf, download date Apr. 26, 2005.

Arnstein, L., "Breaking Down Barriers in the Biology Lab," *CHI 2001 Workshop Presentation on "Building the Ubiquitous computing User Experience,"* Apr. 2, 2001. URL=http://www.cs.washington.edu/homes/larrya/CHIWorkshopSlides.pdf, download date Apr. 26, 2005.

Arnstein, L., "Experiment Capture in the Biology Lab—Disguised as a Lab Assistant for Cell Biologists," *Stanford University Human Computer Interaction Seminar*, Nov. 1, 2001. URL=http://hci.stanford.edu/cs547/abstracts/01-02/011102-arnstein.html, download date Apr. 26, 2005.

"U. Washington Cell System Initiative," *NSF Workshop on Advanced Instrumentation for the New Millenium—Biological Sciences*, Dec. 2001. URL=http://labscape.cs.washington.edu/AINM.ppt, download date Apr. 26, 2005.

Stenger, B., "Scientists Need a Smarter Bench," *Genome Technology*, Apr. 2002, p. 62 and one unnumbered page. URL=http://labscape.cs.washington.edu/genometech.pdf, download date Apr. 26, 2005.

Arnstein, L., et al., "Labscape: A Smart Environment for the Cell Biology Laboratory," *Persvasive Computing*, Jul.-Sep. 2002, pp. 13-21. URL=http://labscape.cs.washington.edu/labscapeIEEE.pdf, download date Apr. 26, 2005.

Arnstein, L., et al., "Systems Support for Ubiquitous Computing: A Case Study of Two Implementations of Labscape," *Proceedings of the First International Conference on Persvasive Computing*, Springer-Verlag, Germany, 2002. URL=http://labscape.cs.washington.edu/PervasiveFinalV2.pdf, download date Apr. 26, 2005.

"Ballard High Biology Students Test New "Wizard" on the Lab Bench," *TREND Newsletter*, University of Washington Engineering, Aug. 30, 2002. URL=http://labscape.cs.washington.edu/TrendSum02.pdf, download date Apr. 26, 2005.

Consolvo, S., et al., "User Study Techniques in the Design and Evaluation of a Ubicomp Environment," *Proceedings of the Fourth International Conference on Ubiquitous Computing*, Springer-Verlag, Germany, Sep. 2002. URL=http://labscape.cs.washington.edu/ubicomp02.pdf, download date Apr. 26, 2005.

U.S. Appl. No. 10/910,958, filed Aug. 03, 2004, Arnstein et al.

U.S. Appl. No. 60/454,756, filed Mar. 14, 2003, Arnstein et al.

U.S. Appl. No. 60/493,748, filed Aug. 08, 2003, Arnstein et al.

U.S. Appl. No. 60/493,749, filed Aug. 08, 2003, Arnstein.

U.S. Appl. No. 60/505,096, filed Sep. 22, 2003, Arnstein.

U.S. Appl. No. 60/508,109, filed Oct. 02, 2003, Arnstein et al.

U.S. Appl. No. 60/543,859, filed Feb. 11, 2004, Arnstein et al.

U.S. Appl. No. 60/608,754, filed Sep. 10, 2004, Arnstein et al.

* cited by examiner

BATCH-BASED METHOD AND TOOL FOR GRAPHICAL MANIPULATION OF WORKFLOWS

BACKGROUND OF THE INVENTION

1. Field of the Invention

The invention is generally related to workflow in research, development, as well as manufacturing, and particularly to tools for automating the performance and documenting of research, development as well as manufacturing activities.

2. Description of the Related Art

Many researchers employ laboratory notebooks, automated spreadsheets such as Excel® available from Microsoft Corporation of Redmond Wash., as will as automated mathematical packages for performing and/or documenting research, development.

In the design of laboratory procedures, it is necessary to take advantage of batch-based regularity. Designers should be able to create a procedure using batch's of operations in place of individual operations, allowing them to easily imply the existence of significant fine-grained structure. The key to batch-based procedure design is to define a simple rule for deriving the fine-grained topology from the batch level procedure created by the user. The rule, or algorithm, should be understandable and predictable for users, while providing them with the power to create a large variety of useful fine-grained topologies.

BRIEF SUMMARY OF THE INVENTION

Tools for defining and executing batch based procedures in an adaptive hierarchical workflow environment are taught herein. Such tools are suitable for a large variety of applications including laboratory procedure planning, execution, documentation, as well as driving a robotic apparatus.

DEFINITIONS AND BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with batch-based procedure design have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1A:
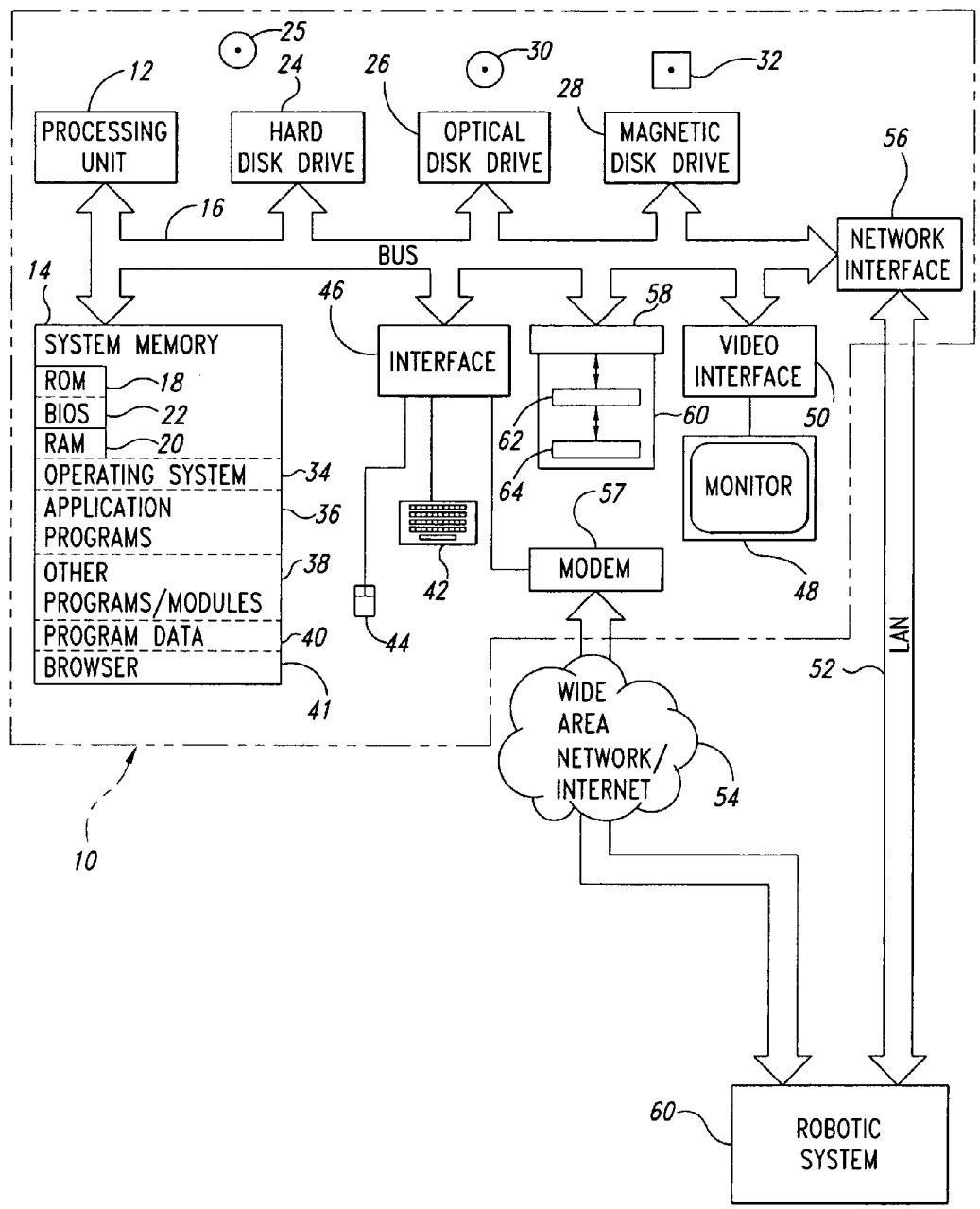
FIG. 1A is a functional block diagram of a computing system suitable for operating an adaptive hierarchical workflow tool according to at least one illustrated embodiment.

FIG. 1A and the following discussion provide a brief, general description of a suitable computing environment in which the invention may be implemented. Although not required, embodiments in the invention will be described in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 1A, a conventional personal computer referred to herein as a computing system 10 includes a processor unit 12, a system memory 14 and a system bus 16 that couples various system components including the system memory 14 to the processing unit 12. The processing unit 12 may be any logical processing unit, such as one or more central processing units (CPUs), digital signal processors (DSPs), application-specific integrated circuits (ASIC), etc. Unless described otherwise, the construction and operation of the various blocks shown in FIG. 1A are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 10, such as during startup.

The computing system 10 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the computing system 10. Although the depicted computing system 10 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a browser 41 for permitting the computing system 10 to access and exchange data with sources such as websites of the Internet, corporate intranets, or other networks, as well as other server applications on server computers. The browser 41 is markup language based, such as hypertext markup language ("HTML"), and operate with markup languages that use syntactically delimited characters added to the data of a document to represent the structure of the document.

While shown in FIG. 1A as being stored in the system memory, the operating system 34, application programs 36, other program modules 38, program data 40 and browser 41 can be stored on the hard disk 25 of the hard disk drive 24, the optical disk 30 and the optical disk drive 26 and/or the magnetic disk 32 of the magnetic disk drive 28. A user can enter commands and information to the computing system 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The computing system 10 can include other output devices such as speakers, printers, etc.

The computing system 10 can operate in a networked environment using logical connections to one or more remote computers or robotic system, for example, a microfluidic system 60. The computing system 10 may employ any known means of communications, such as through a local area network ("LAN") 52 or a wide area network ("WAN") or the Internet 54. Such networking environments are well known in enterprise-wide computer networks, intranets, and the Internet.

When used in a LAN networking environment, the computing system 10 is connected to the LAN 52 through an adapter or network interface 56 (communicatively linked to the bus 16). When used in a WAN networking environment, the computing system 10 often includes a modem 57 or other device for establishing communications over the WAN/Internet 54. The modem 57 is shown in FIG. 1A as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 1A are only some examples of establishing communication links between computers and/or robotic systems 60, and other links may be used, including wireless links.

The computing system 10 may include one or more interfaces such as slot 58 to allow the addition of devices either internally or externally to the computing system 10. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processor unit 12 for execution. Such a medium may take many forms, including but not limited to, non-volatile media, volatile media, and transmission media. Non-volatile media includes, for example, hard, optical or magnetic disks 25, 30, 32, respectively. Volatile media includes dynamic memory, such as system memory 14. Transmission media includes coaxial cables, copper wire and fiber optics, including the wires that comprise system bus 16. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor unit 12 for execution. For example, the instructions may initially be carried on a magnetic disk of a remote computer. The remote computer can load the instructions into its dynamic memory and send the instructions over a telephone line using a modem. A modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processor unit 12 retrieves and executes the instructions. The instructions received by system memory 14 may optionally be stored on storage device either before or after execution by processor unit 12.

Problem Example

Figure 1B:
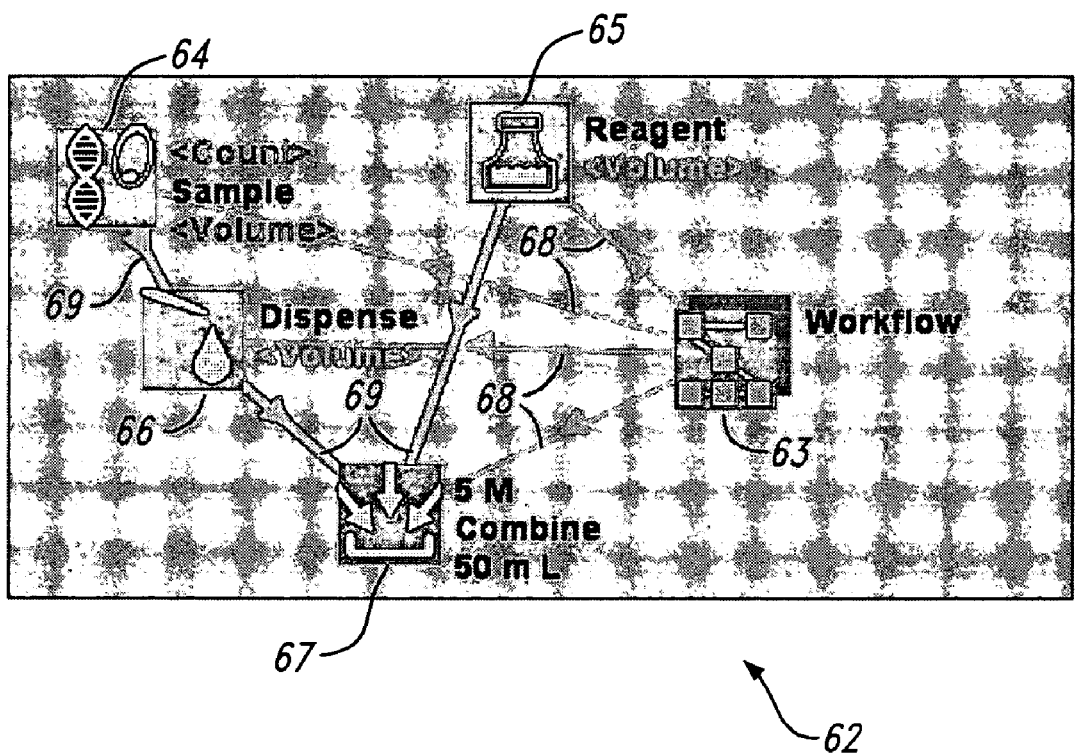
FIG. 1B is a diagrammatic illustration of a sample flow graph for a exemplary procedure represented with an adaptive workflow model according to at least one illustrated embodiment.

FIG. 1B shows a simple hierarchical workflow diagram 62 of a set of tasks to be performed by a person or a robotic instrument in a biology laboratory: This workflow diagram 62 is hierarchical because the node labeled "Workflow" 63 contains the other four nodes, labeled "Sample" 64, "Reagent" 65, "Dispense" 66, and "Combine" 67. The light arrows 68 indicate containership, while the heavy arrows 69 indicate workflow sequence.

In this example, the goal of the workflow 63 is to combine the biological sample with some reagent to reach a desired volume of 50 mL at a count of 5 million cells. More importantly, the required volumes of sample and reagent must be computed based on the number of cells and volume (cell density) of the original sample. For example the volume of the original sample that must be dispensed is the ratio of the desired count (5M) to the total count of the sample multiplied by the volume of the sample: (volume*total/desired). This volume is then subtracted form the desired volume (50 mL) to determine how much reagent is needed. Such formulas are very similar to the type of formulas that one might find in a spreadsheet, but unfortunately, the free-form structure of the flow graph does not allow row and column locations to be used as a way of referring to variables.

Disclosed herein is a hierarchical naming and lookup algorithm to allow users to create simple expressions in terms of node and property names. Using the method, explained in detail below, the above formulae would be expressed as:

Dispense.Volume=(Combine.Count/Sample.Count)*

Sample.Volume

Reagent.Volume=Combine.Volume−Dispense.Volume

Problem Definition

Given a general graph structure G(E,N) in which the nodes and edges in the graph can be annotated with properties (key:value pairs such as Volume:50 mL or Count:10 M), there are many applications in which it may be desirable for property values to be computed from other property values using mathematical formulas such as those employed in spreadsheet systems.

Figure 1C:
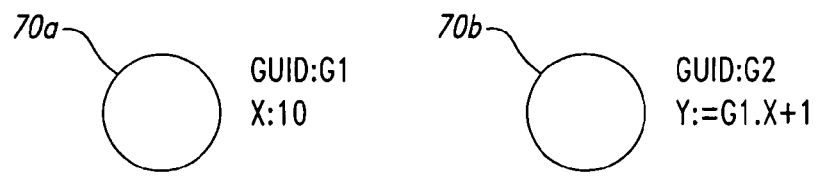
FIG. 1C is a schematic diagram of a number of individual nodes and edge elements and associated properties according to one illustrated embodiment in which a respective globally unique identifier is associated with each element.

FIG. 1B shows one solution, which assumes that each node or edge 70a, 70b has a globally unique id (GUID). With this assumption, other property values can be referenced in formulas using GUID.KEY expressions, such as "G1.X". A simple formula using this expression could be G1.X+1, which would evaluate to 11 as illustrated in FIG. 1C.

The evaluation method is simply to search for the node whose GUID matches "G1" and look up the value of property X on that node. This method works completely independently of hierarchy so it can be used for edges that cross hierarchy boundaries. However, this method would also require all variables in all formulas to be expressed as GUID.KEY pairs which are not likely to be compact or human-readable. Real-world GUIDs are usually cryptic machine generated strings of at least 128 bits they are likely to grow over time. GUIDs that are human-readable are extremely long, rendering formulas that use such references unreadable.

Name Resolving Approach

The solution is to allow nodes and edges to have NAME properties that are short, human readable, and user selectable, but which are not necessarily unique. The main difference between this approach and the above described approach is that NAMEs are not assumed to be unique. As a result, a name resolution search algorithm must be applied whose behavior is predictable to users, and which allows the use of simple names in most cases.

References to property values in formulas are expressed as a sequence of identifiers separated by some separator such as ".". The last item in the sequence is a property key and all of the preceding items in the sequence are node names. The algorithm presented below defines how the sequence of node names is mapped to an actual node in a hierarchical graph structure. The algorithm's search order can be roughly described as "self" followed by "child" followed by "parent". The algorithm is first explained by example, and then by a formal definition.

EXAMPLE

Figure 1D:
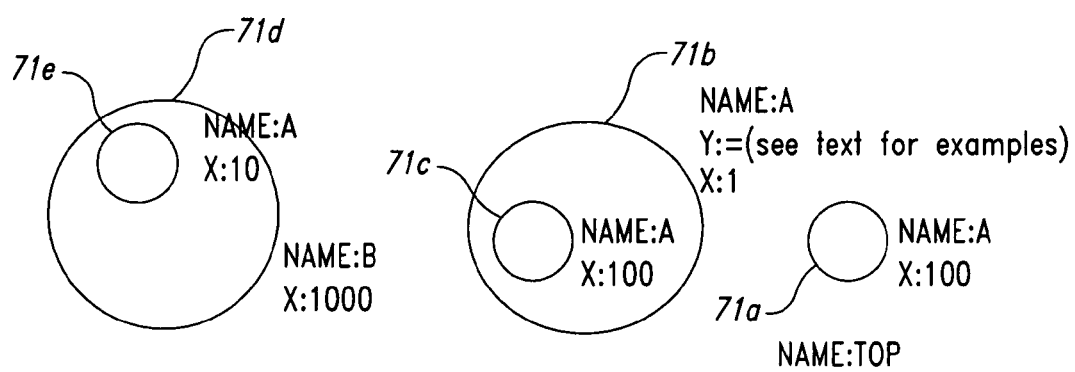
FIG. 1D is a schematic diagram illustration of a number of individual nodes and edge elements and associated properties according to one illustrated embodiment in which a name resolution technique uniquely resolves the globally non-unique names associated with the elements.

FIG. 1D shows an example employing 5 nodes 71a–71e that illustrates how property values can be referenced in a hierarchical system of nodes. For illustrative purposes, each node has a NAME property that is not necessarily unique and all nodes in this example have a property whose key is X. Also, there is a node 71a whose NAME property is "TOP" that contains all of the other nodes (respecting hierarchy).

We define the originating node to be the node to which the property containing the formula is attached. In the diagram, the original node is 71b and has NAME, Y, and X properties. Some examples of formulas for the value of Y and how they are evaluated are given as follows:

Y:=X evaluates to 1 because references of only one item are regarded as a key, which matches a property of the originating node (self).

Y:=A.X also evaluates to 1 because the name of the originating node is A and it is searched first (self).

Y:=A.A.X evaluates to 100 because the first name in the reference, "A", matches the name of the originating node (self) and the second NAME, "A" matches the name of a member of the originating node. Note, again, the originating node is search first, resulting in successful match.

Y:=TOP.A.A.X also evaluates to 100. "TOP" does not match the originating node's name (self) nor the names of any of its members (child), or their members, so the search algorithm passes the entire reference to the originating node's container (parent). Since TOP matches at this level, all of TOP's members are again searched, according to the same algorithm, for the remainder of the reference, which is "A.A.X". This evaluates to 100 as explained above.

Y:=B.X evaluates to 1000 since it fails at self, and children.

Y:=B.A.X evaluates to 10 for the same reason.

Y:=TOP.A.X is ambiguous, evaluating to either 1 or 10000. The actual result is implementation specific and not defined by this specification.

Formal Definition

The formal pseudo-code definition of the search algorithm is recursively defined as follows:

Definitions
1. Given a reference V as an ordered set of identifiers [I0 . . . In]
2. pre(V) evaluates to I0 iff n>0 and null otherwise.
3. rem(V) evaluates to [I1 . . . In]
4. key(V) evaluates to In.

Algorithm

```
match(node,V,src) return a value of the desire property {
    if (node == src) return null (base case to prevent infinite loop)
    if (pre(V) == null) // reference is just a key
        if      (hasProperty(node, key(V)))      return getPropertyValue(node,key(V))
    if (pre(V) == getPropertyValue(node,NAME)) {
        // search children with remainder of V
        for each child of node {
            result = match(child, rem(V), src)
            if (result != null) return result
        }
    } else {//reference does not match this node
        // search children with all of V
        for each child of node {
            if (child != src) result = match(child,V, src)
            if (result != null) return result
        }
    }
    // search container with all of V
    return match(getParent(node),V, src)
}
```

It is it is beneficial and powerful to support indirect addressing by allowing reference strings to be embedded in other reference strings using brackets or some other lexical convention as in the following example:

The reference "n1.n2.n3.[n1.key1].n4.key2" is resolved by resolving the nested expressions in reverse depth first order starting at the originating node for all evaluations. So, if match(node, "n1.key1") evaluates to "x" then match( ) would be called again after substituting the bracketed reference with "x" as in: match(node"n1.n2.n3.x.n4.key2").

A specific application of this technique is to allow the index of a member of an order hierarchical set of nodes to be used to reference a similarly indexed member of another hierarchical set as in "n1.n2.[INDEX]+n1.n3.[INDEX]" where INDEX is the key of a property of the originating node that specifies its position in the ordered set. In addition to this example, are several other general applications for this method that supports arbitrary levels of indirection in reference strings.

Edges

The search algorithm for edge properties is identical to that for nodes, except that containership is defined as the least common container of the two nodes to which the edge is connected. Let E be an edge that is connected to nodes N1 and N2. As an example, if N1 is contained in N3 which is in turn contained in N4, and N2 is contained directly by N4, then E is contained directly by N4 as the least common container of E's nodes. Edges do not have members, so the search algorithm is self, followed by parent. The above algorithm applies directly to edges.

Application Example

Figure 1E:
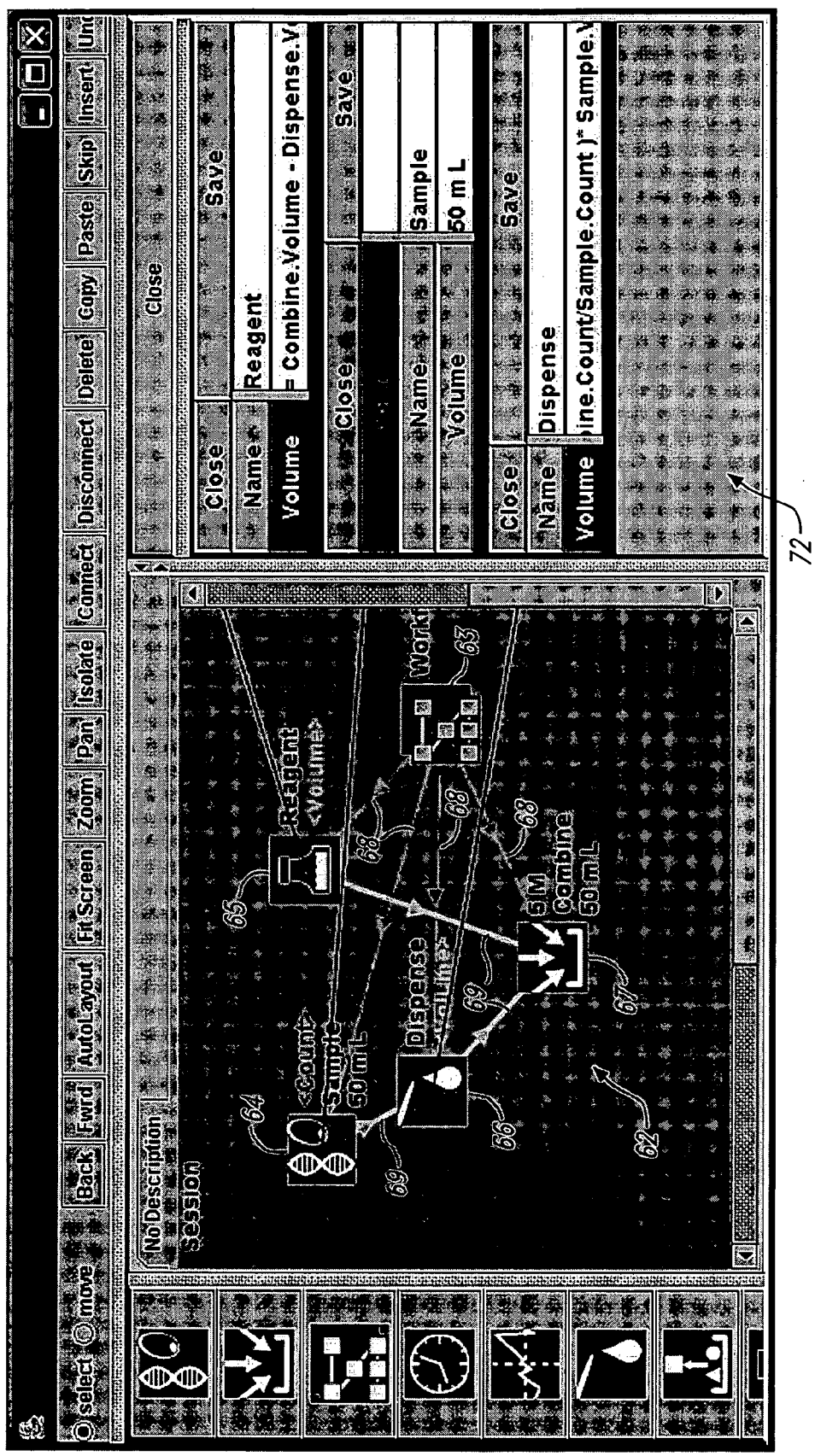
FIG. 1E is a screenshot of a user interface of an adaptive workflow tool according to at least one illustrated embodiment, illustrating how properties and values may be associated with a sample workflow procedure.

In FIG. 1E, the properties associated with each node 63-67 in the workflow diagram 62 are shown in the table 72 to the right as they appear prior to entering a value for Sample.Count. The "Reagent" node has a volume property whose value is a formula expressed in terms of "Combine.Volume" and "Dispense.Volume". Meanwhile "Dispense.Volume" is expressed in terms of "Sample.Count" and "Combine.Count". Note that according to the algorithm, the expression "Combine.Volume" could have been replaced to "Workflow.Combine.Volume".

Figure 1F:
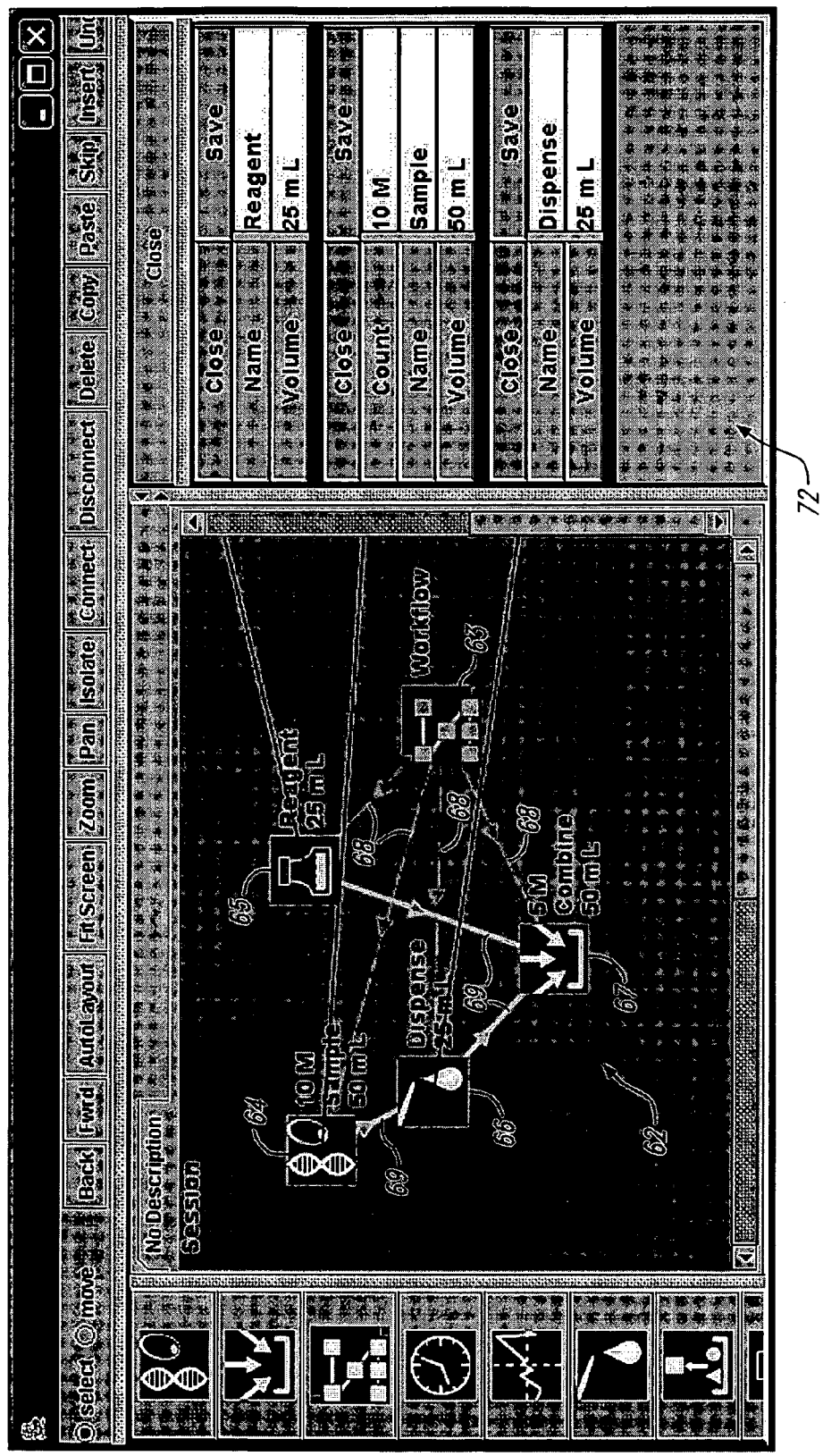
FIG. 1F is a screenshot of the user interface of FIG. 1E, further illustrating required values may be calculated using naming and searching algorithms taught herein.

FIG. 1F shows how, using the naming and searching algorithm described above, the system can compute the required volumes after a value for Sample.Count is entered as illustrated in the updated table 72.

One mode for practicing this invention is as software instructions stored on a computer-readable medium that causes a computing system to implement the above algorithm and which can represent a hierarchical graph structure in which the nodes and edges are annotated with properties (key.value pairs).

Figure 2A:
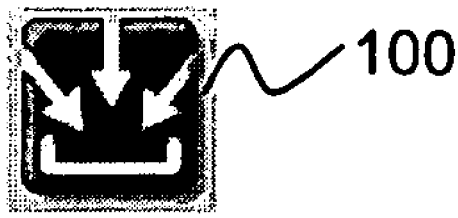
FIG. 2A is a diagrammatic illustration of an icon representing an operation in an adaptive workflow model according to at least one illustrated embodiment.

FIG. 2A shows an icon 100 representing an operation in the adaptive workflow tool environment. Operations represent actions that are performed on data or materials. Inputs and outputs are represented by arcs terminating (inputs) and originating (outputs) at the operation. In particular, the icon 100 of FIG. 2A illustrates represents a "Combine" operation.

A container is a collection of operations and other containers, allowing for arbitrary levels of hierarchy. There are two types of containers, either 1) Batches or 2) Procedures. Only the subclasses of container have graphical (i.e., icon) representations. Two examples are defined below.

Figure 2B:
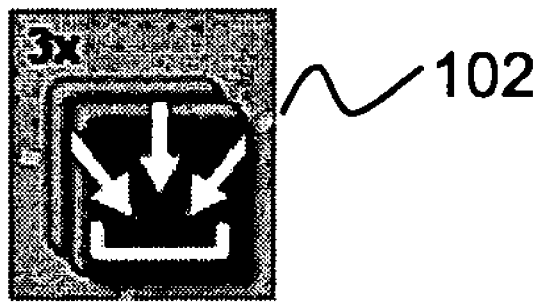
FIG. 2B is a diagrammatic illustration of an icon representing a batch in an adaptive workflow model according to at least one illustrated embodiment.

FIG. 2B shows an icon 102 representing a batch in the adaptive workflow tool environment. A batch is a sub-class of the container in which all of the members are organized according to a coordinate system associated with the batch. The text at the top left corner of the icon 102 represents the size and dimensionality of the coordinate system of the batch. In particular, the icon 102 in FIG. 2B illustrates a one-dimensional batch of three individual combine operations.

Figure 2C:
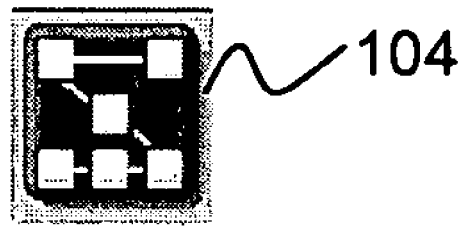
FIG. 2C is a diagrammatic illustration of an icon representing a workflow model or procedure.

FIG. 2C shows an icon 102 representing a procedure in the adaptive workflow tool environment. The procedure is a sub-class of the container, that specifies a partially ordered sequence of operations that may include sub-procedures and batches, for example as illustrated in the Sample Flow Graph (SFG) below.

Figure 3:
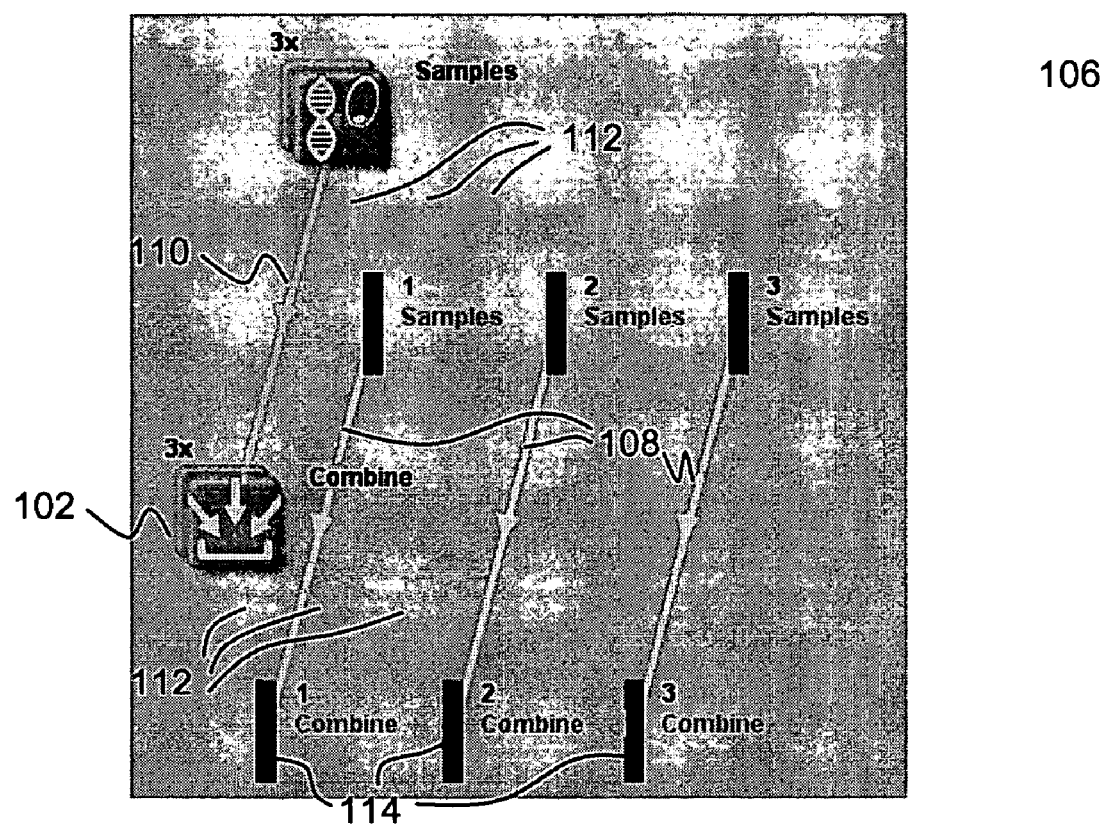
FIG. 3 is a diagrammatic illustration of a sample flow graph for a exemplary procedure represented with an adaptive workflow model according to at least one illustrated embodiment.

FIG. 3 shows a Sample Flow Graph (SFG) 106. An SFG is a hierarchical directed graph that represents a procedure. Nodes in the SFG represent operations or containers. There are two kinds of arcs that can connect operations and containers: a) material flow arcs 108 (white), which start and end on operations; and template arcs 110 (yellow), which start or end on containers. The faint arrows 112 indicate a "contains" relationship. Each of the green bars 114 labeled "Combine" is a graphical representation of a single combine operation that is a member of the batch of combine operations labeled "Combine" 102. The numbers on the individual combine operations represent their position in the batch (See Index below).

Figure 4:
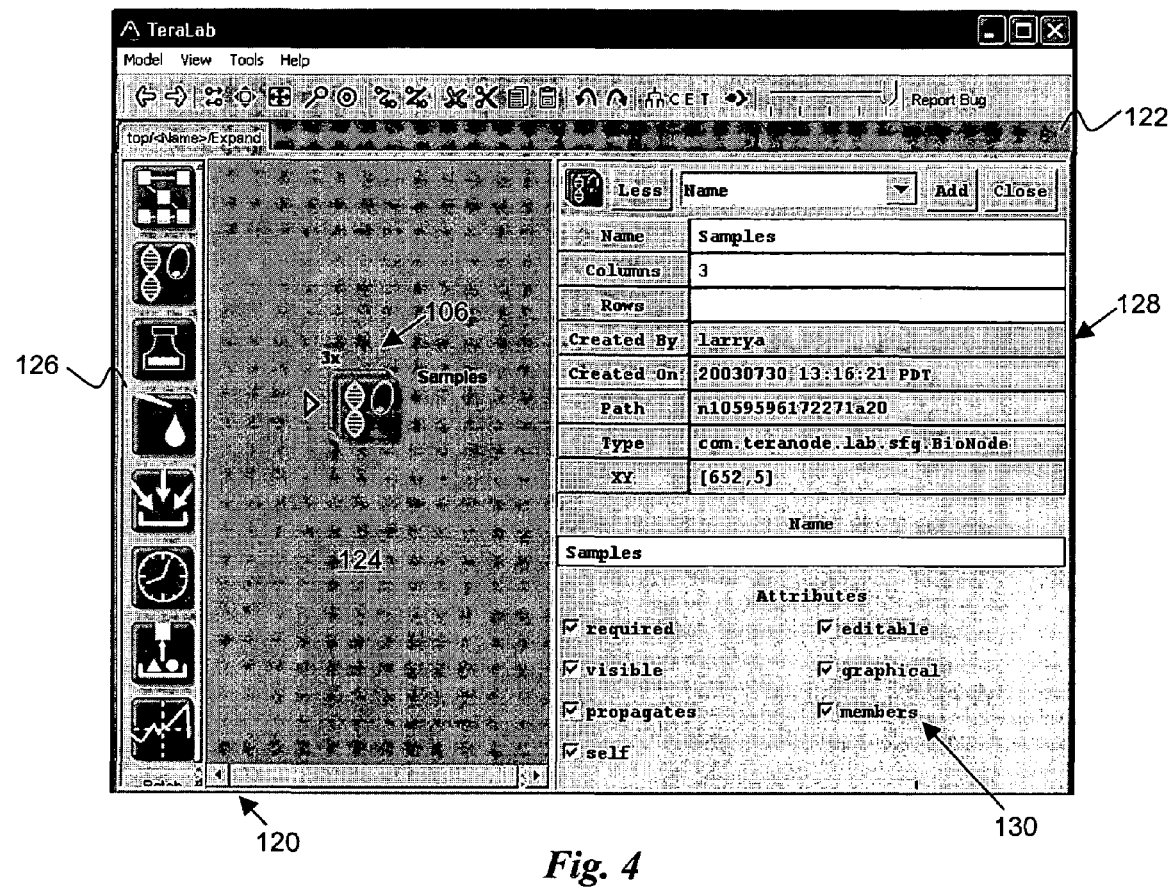
FIG. 4 is a screenshot of a user interface of an adaptive workflow tool according to at least one illustrated embodiment, illustrating properties that may be associated with a sample batch.

FIG. 4 is a screenshot of a user interface 120 of an adaptive workflow tool according to at least one illustrated embodiment, illustrating properties that may be associated with a sample batch. The user interface 120 includes a variety of user selectable icons, menus, pallets, buttons, and/or dialog boxes to allow a user to create and modify templates, and to otherwise operate the workflow tool. In particular, the user interface 120 includes one or more tool bars 122 extending along a horizontal edge of the workspace 124, with a variety of user selectable icons for manipulating various aspects of a defined workflow as represented by an SFG 106. The user interface 120 also includes a second tool bar 126 extends along a vertical edge of the workspace 124, with a variety of user selectable icons for creating and defining operations, batches and procedures. The user interface 120 also includes a number of text fields 128 to indicate certain characteristics of the batches, procedures and/or operations and a number of checkboxes 130 for indicating the settings of certain attributes of the batches, procedures and/or operations. The user may select the various user selectable icons to define a workflow module represented by SFG 106 in a template which is graphically represented in the workspace 124.

Figure 5:
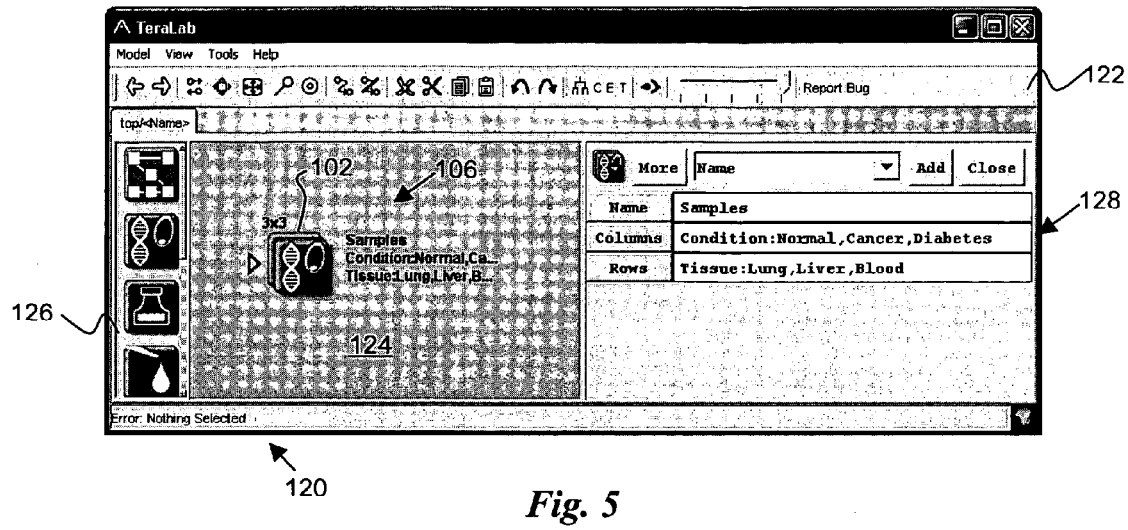
FIG. 5 is a screenshot of a user interface of an adaptive workflow tool according to at least one illustrated embodiment, illustrating an exemplary batch and associated coordinate system of the batch.

FIG. 5 shows the properties associated with the exemplary Samples batch from FIG. 4. A property is a key-value pair that is associated with nodes and arcs in the SFG 106. Properties are used to specify parameters that are appropriate for each type of operation or container. The value can be of any data type. In this example, the Samples batch includes a first property having the key "Condition" with values "Normal," "Cancer," and "Diabetes," and a second property having the key "Tissue" with values "Lung," "Liver," "Blood." One skilled in the art will appreciate that this is only example of a batch, and properties, and that batches with a greater or lesser number of different conditions may be defined.

An attribute is a key-value pair in which the value is always a true or false value. Attributes are associated with properties, whereas properties are only associated with operations and containers. Sample attributes such as "required" and "visible" for the property "Name" are shown in FIG. 4.

Figure 6:
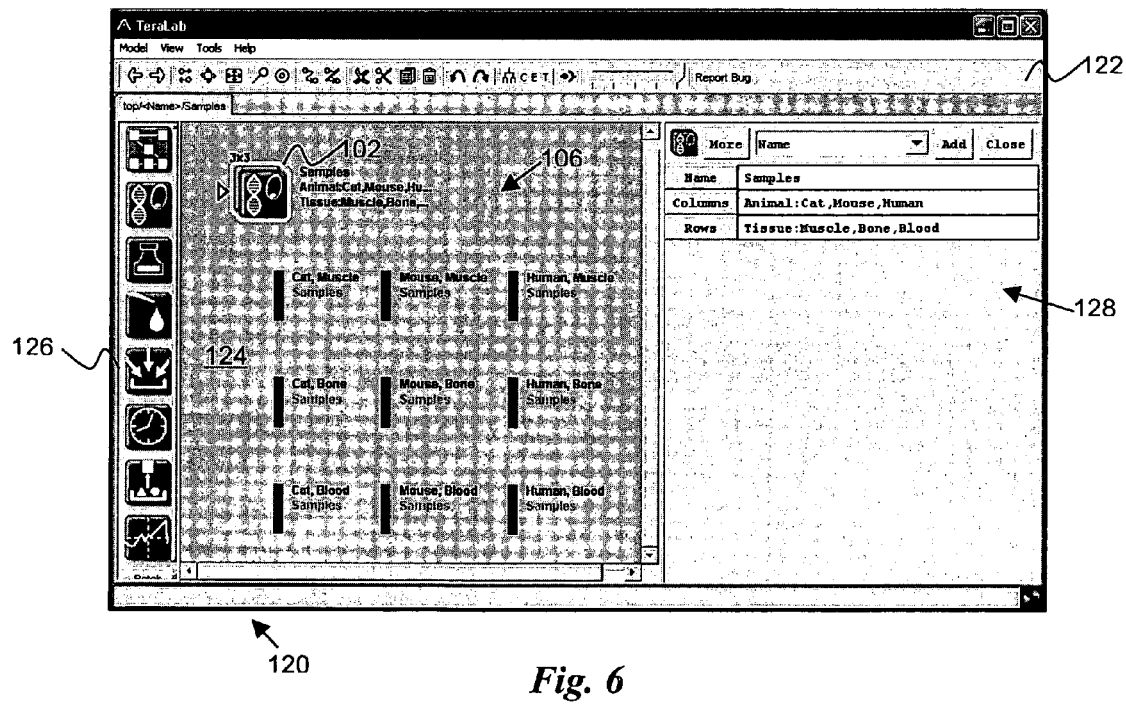
FIG. 6 is a screenshot of a user interface of an adaptive workflow tool according to at least one illustrated embodiment, illustrating an exemplary batch and associated members of the batch.

FIG. 6 shows an exemplary batch 102 and its coordinate system. Batches have a "coordinate system" that is defined by axis descriptor properties. An axis descriptor property specifies a finite discrete domain (sequence of integers, strings, or any other datatype). A batch's coordinate system can have any number of axes which must have a defined default order (e.g., Axis1, Axis2, Axis3; Columns, Rows, Plates; X, Y, Z, etc.). In the example of FIG. 6, the batch 102 specifies a 3×3 2-D batch on Columns and Rows. Thus, the batch 102 in FIG. 5 has two axis descriptor properties, Columns and Rows. Together, they specify a 3×3 2-D coordinate system. In particular, for exemplary batch 102 "Samples" illustrated in FIG. 6, the coordinate system has 2-dimensions: animal type and tissue type. Each member of the batch 102 has an index property that specifies its position within the batch's coordinate system.

A member of a batch is an operation or container that is in the batch. All members must have an "Index" property that specifies the member's position within the batch's coordinate system.

An index is the property of a batch member that specifies the member's position in the batch. The index property is vector in the batch's coordinate system, so it has one numerical entry for each axis. The AutoFill algorithm taught herein does not require all batches to have the same dimensionality, but it does require that all batches agree on the default ordering of axes so that indices in different coordinate systems can be compared. As a result index properties can have "empty" entries in the vector representation for axes that are not included in their batch's coordinate system. The following example is illustrative:

Let X,Y,Z be the ordering of axes for all batches
Let A be a 1-D batch defined only in the X axis.
Let B be a 1-D batch defined only in the Y axis.
Let operation L be a member of A. L therefore must have an Index property (Vector) that is defined in X but not in Y and Z. The can be expressed as "1,".
Let operation M be a member of B. M therefore must have an Index property (Vector) that is defined in Y but not in X and Z. This can be expressed as",1,".

By convention, the trailing commas are dropped so that ordered coordinate systems can have an indefinite number of axes (as in Axis1, Axis2, Axis3, . . . , AxisN) without requiring infinitely long Index vectors. So the Index of L would be "1" and the index of M would be ",1". In summary, if an axis is not defined for the batch, index is empty at that corresponding position. This definition is important for the AutoFill algorithm definition, defined below.

PROBLEM EXAMPLE

Figure 7:
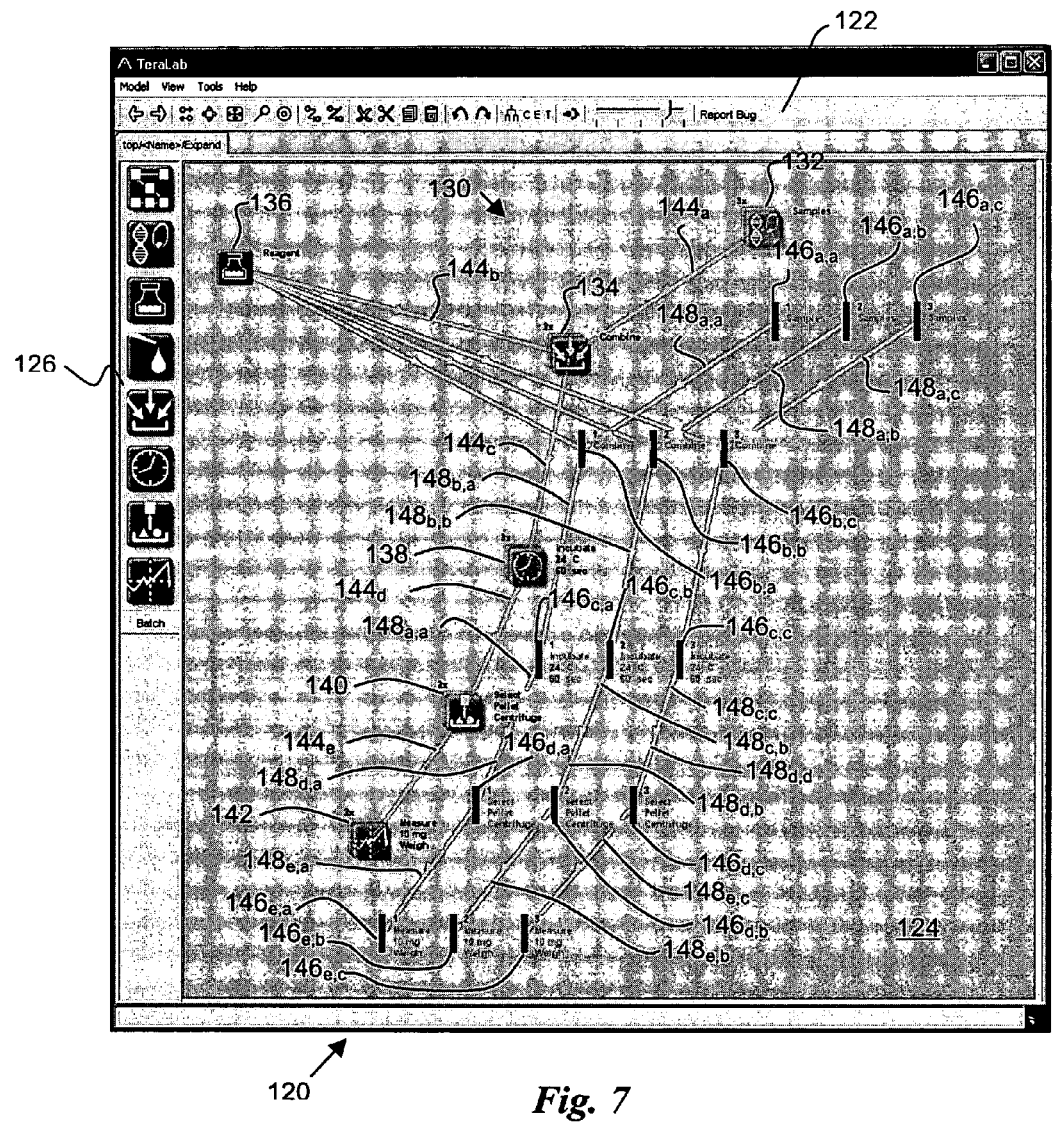
FIG. 7 is a screenshot of a user interface of an adaptive workflow tool according to at least one illustrated embodiment, illustrating an exemplary laboratory procedure.

FIG. 7 shows a graphical layout for a simple laboratory procedure 130 that is to be performed on a set of samples represented by an icon 132. Each sample is to be combined represented by icon 134 with a single reagent represented by icon 136, then incubated as represented by icon 138, selected as represented by icon 140, and measured as represented by icon 142. The sequence of operations that is performed on each sample is essentially the same, with only minor variations of some parameters for each sample. Thus, it would be advantageous to allow the users to draw out the sequence only once using "batches" of operations, and then enter only parameters that vary individually either by opening the batches or in a tabular view.

The large icons 132, 134, 136, 138, 140, 142 and arrows 144$_a$–144$_e$ (yellow) show the batch structure that is created by the user. After specifying that each batch is of size 3, the system should automatically create the fine grained structure represented by the small bars 146$_{a,a}$–146$_{e,c}$ (green) and arrows 148$_{a,a}$–148$_{e,c}$ (white). Note that the reagent icon 136 is not a batch. As a result the reagent icon 136 is connected to each of the three "combine" operations contained in the "Combine" batch of operations.

Figure 8:
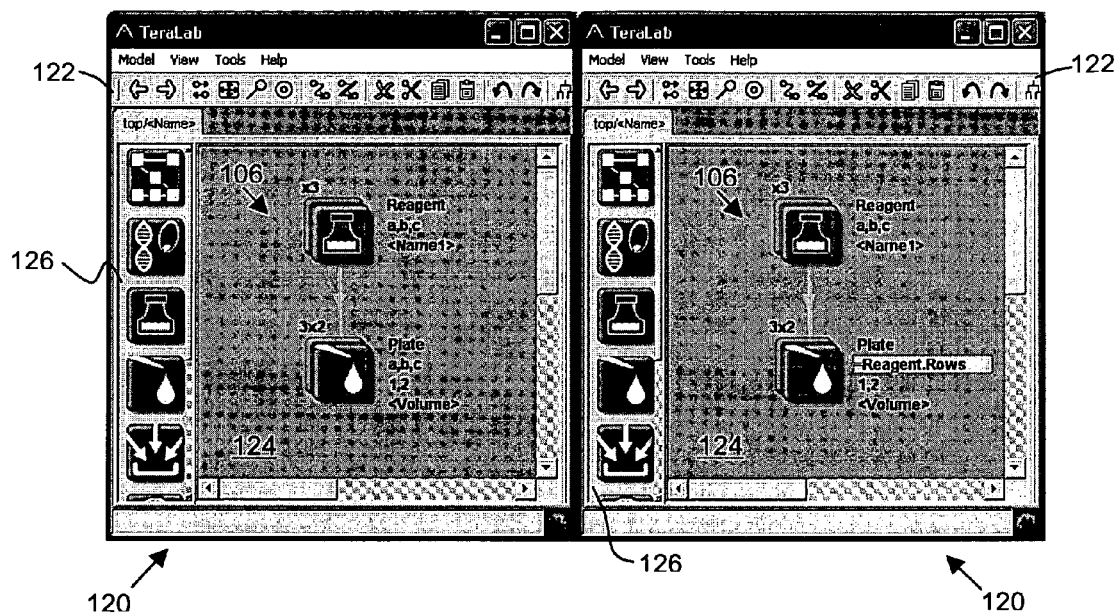
FIG. 8A is a screenshot of a user interface of an adaptive workflow tool according to at least one illustrated embodiment, illustrating an exemplary template before running an autofill algorithm.
FIG. 8B is a screenshot of a user interface of an adaptive workflow tool according to at least one illustrated embodiment, illustrating how an exemplary expression can be used to derive a plate's row axis definition from a row axis definition of Reagents.

FIGS. 8A and 8B show a template created by user prior to running the AutoFill algorithm. In particular, FIG. 8A shows how one might want to specify that a one-dimensional batch of samples should be distributed into a two-dimensional array (or plate) so that each sample is dispensed into one entire row. FIG. 8B shows how an expression can be used derive the Plate's Row axis definition from the Row axis definition of the Reagents. Because the Column axis is not defined for the reagent batch, Rows a, b, and c should be connected to Rows a, b, and c in the Plate for both Columns 1 and 2. The goal is to allow the user to set up connections and coordinate systems only at the batch level, in a way that will allow the system to generate the correct fine-grained graph structure. This may employ the algorithm for completing, or "filling in" the fine-grained structured referred to herein as the "AutoFill" algorithm.

Figure 9:
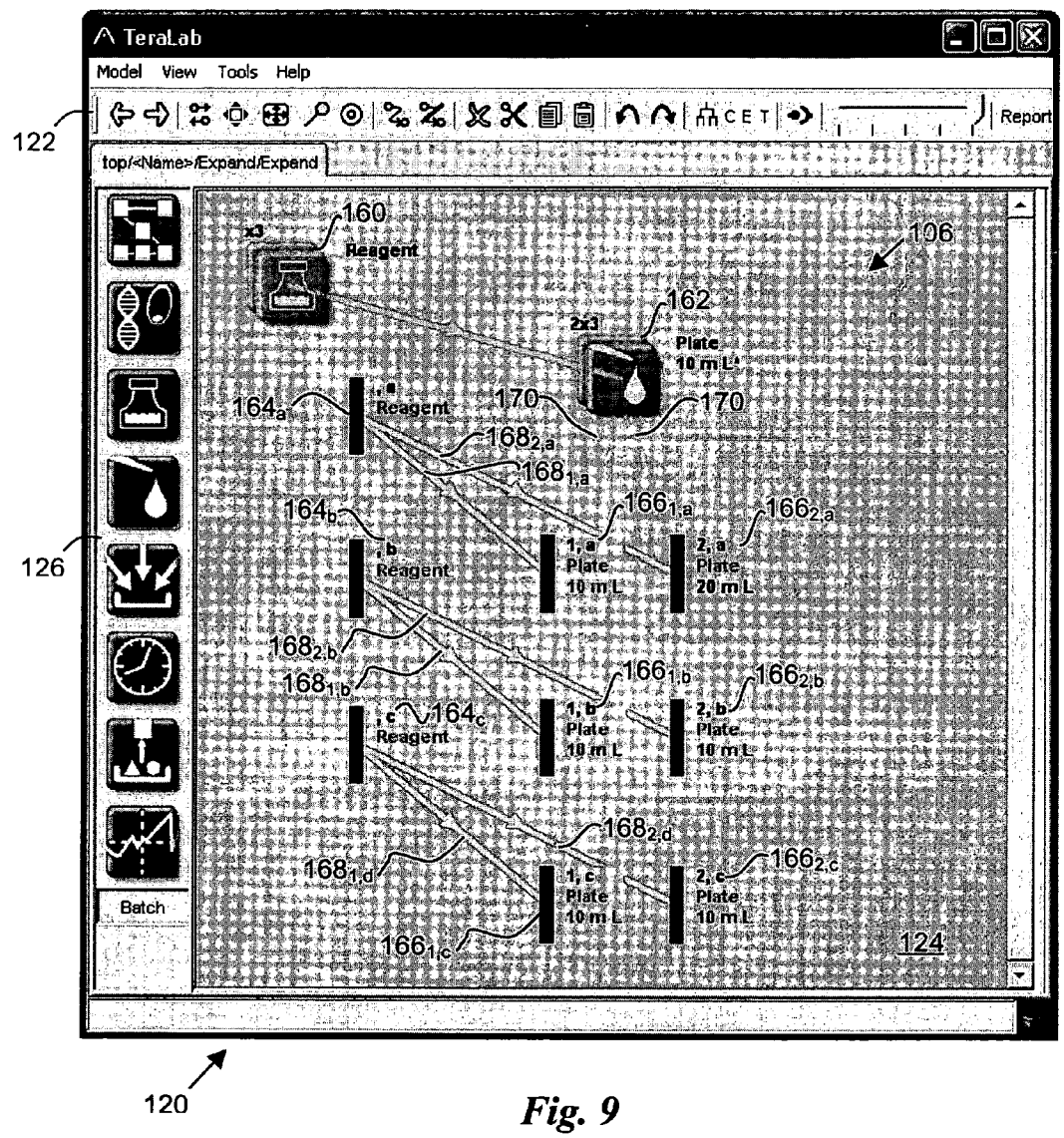
FIG. 9 is a screenshot of a user interface of an adaptive workflow tool according to at least one illustrated embodiment, illustrating an exemplary template after running an autofill algorithm.

FIGS. 8A and 9 shows how the model should look before and after execution of the AutoFill algorithm, respectively. In the next section, we present the details of the AutoFill algorithm that allows users to easily specify a wide variety of useful topologies.

In particular, FIG. 9 shows the workflow module as SFG 106 resulting from the running the AutoFill algorithm. A reagent batch is represented by icon 160, while a dispense operation is represented by icon 162. The vertical bars 164$_a$–164$_b$ and 166$_{1,a}$–166$_{2,c}$ are the batch members and the arrows 168 (white) are the material flow arcs that were generated by the AutoFill algorithm. This SFG 106 indicates that Reagent ,a is dispensed into both 1,*a* and 2,*a* of the plate. Arrows 170 (faint) indicate containership.

AutoFill Algorithm

The following algorithm generates the graph structure shown in FIG. 9 from the user provided template shown in FIG. 8A:

For All nodes F and G in the SFG, such that:
F is a node in Batch A; and
G is a node in Batch B; and
F!=G; and
There exists a template edge from A to B
Create a new edge from F to G if and only if
For all i,
F.Index.e$_i$=G.Index.e$_i$ "Entry i of F's Index=Entry i of G's Index"; or
F.Index.e$_i$ is empty; or
G.Index.e$_i$ is empty In other words, the algorithm connects members of connected batches that match at each index position, where empty positions match any entry or other empty entries. This algorithm also works for operations that are not contained in a batch, but which are connected to a batch by an edge. Since such operations do not have Index properties, they match all of the Index properties of the connected Batch members. This is useful for connecting a single operation to every member of a batch.

This simple, general algorithm can be used to automatically generate many useful graph structures such as distribution of reagents into the rows, columns, or every well of a plate; generation of a "cross product" of two one-dimensional batches (FIGS. 10 and 11), pooling of samples across rows and columns (FIGS. 12 and 13), selection from a batch of operations, and transposition.

Autofill Examples

FIGS. 10–15 and the following descriptions explain how to describe a variety of useful topologies at the batch level so that the correct fine grained structure will be generated by the AutoFill algorithm. The examples include:

- Cross: create the complete set of pair-wise relationships between members of two one-dimensional batches.
- Pool: Reduce the dimensionality of a batch by combining all of the samples that match across the pooled dimension. An example would be to combine all of the tissue types for each animal type in the 2D batch described in FIG. 6. This would result in a 1D batch that eliminates the Tissue Type dimension.
- Select: allows only part of a batch to be used in subsequent steps of a procedure by matching to a subset of the original batch's coordinate system.
- Transpose: By changing the order of the coordinate system of a batch when the AutoFill algorithm is run, a Row can be transformed into a Column, enabling the creation of a variety of useful experimental structures. One example is that a single batch can be crossed with itself to produce all possible combinations within a set of samples.

Cross

Figure 10:
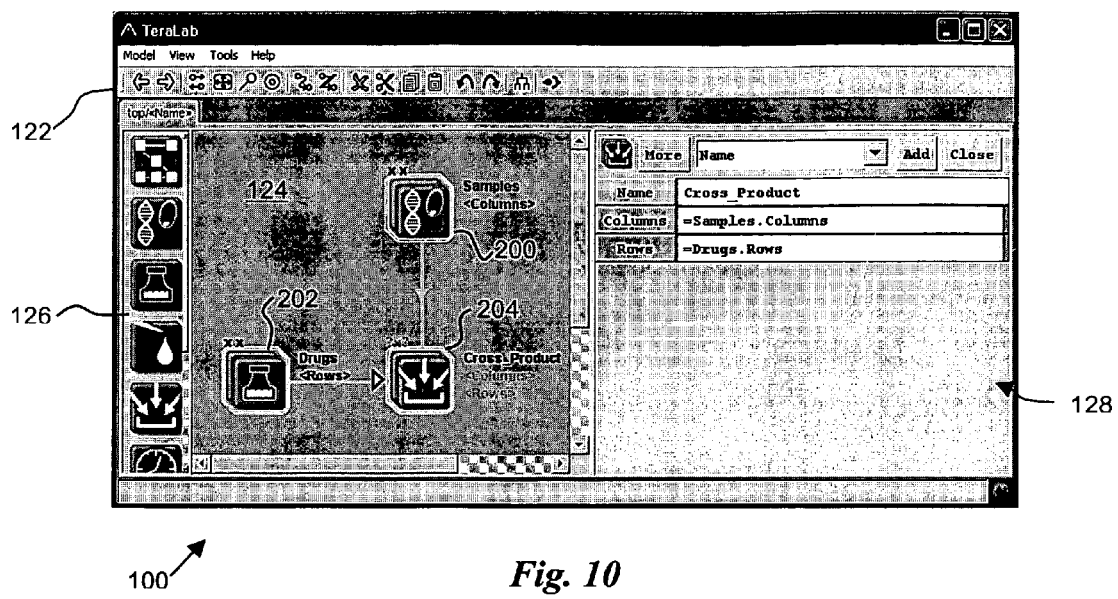
FIG. 10 is a screenshot of a user interface of an adaptive workflow tool according to at least one illustrated embodiment, illustrating an exemplary template setting up of a cross function.
Figure 11:
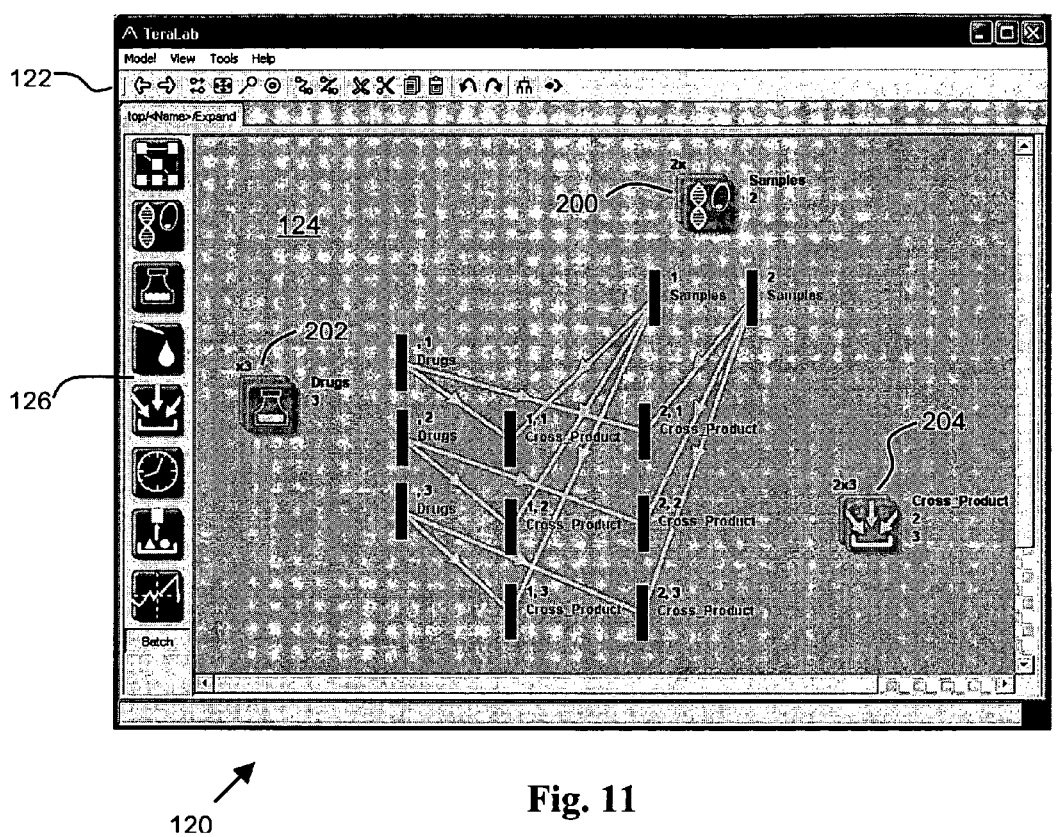
FIG. 11 is a screenshot of a user interface of an adaptive workflow tool according to at least one illustrated embodiment, illustrating an exemplary template after performing the cross function.

FIGS. 10 and 11 show how to setup and the results of a "Cross" experiment that combines each sample with each drug in a plate. In particular FIG. 10 shows the setting up of the cross. As shown in FIG. 10, the Samples represented by icon 200 are arranged as a single dimension along the Column axis; the Drugs represented by icon 202 are arranged as a single dimension along the Row axis; and the Plate is defined as a 2D dimension, with its Rows defined by the Drug batch, and its Columns defined by the Samples batch. The AutoFill algorithm will match x,y in the Plate with x in the Samples and ,y in the Drugs, resulting in the combination of Drug y with Sample x in a cross product represented by icon 204. The result is the fine grained topology shown in FIG. 11. Note, that the batch of combine operations derives its Column axis definition from Samples and its Row axis definition from Drugs so that the user only needs to specify this information in one place.

FIG. 11 shows the resulting fine grained graph topology generated by the AutoFill algorithm for the Cross example of FIG. 10, after having entered axis definitions for the Samples.Columns and Drugs.Rows.

Pooling

Figure 12:
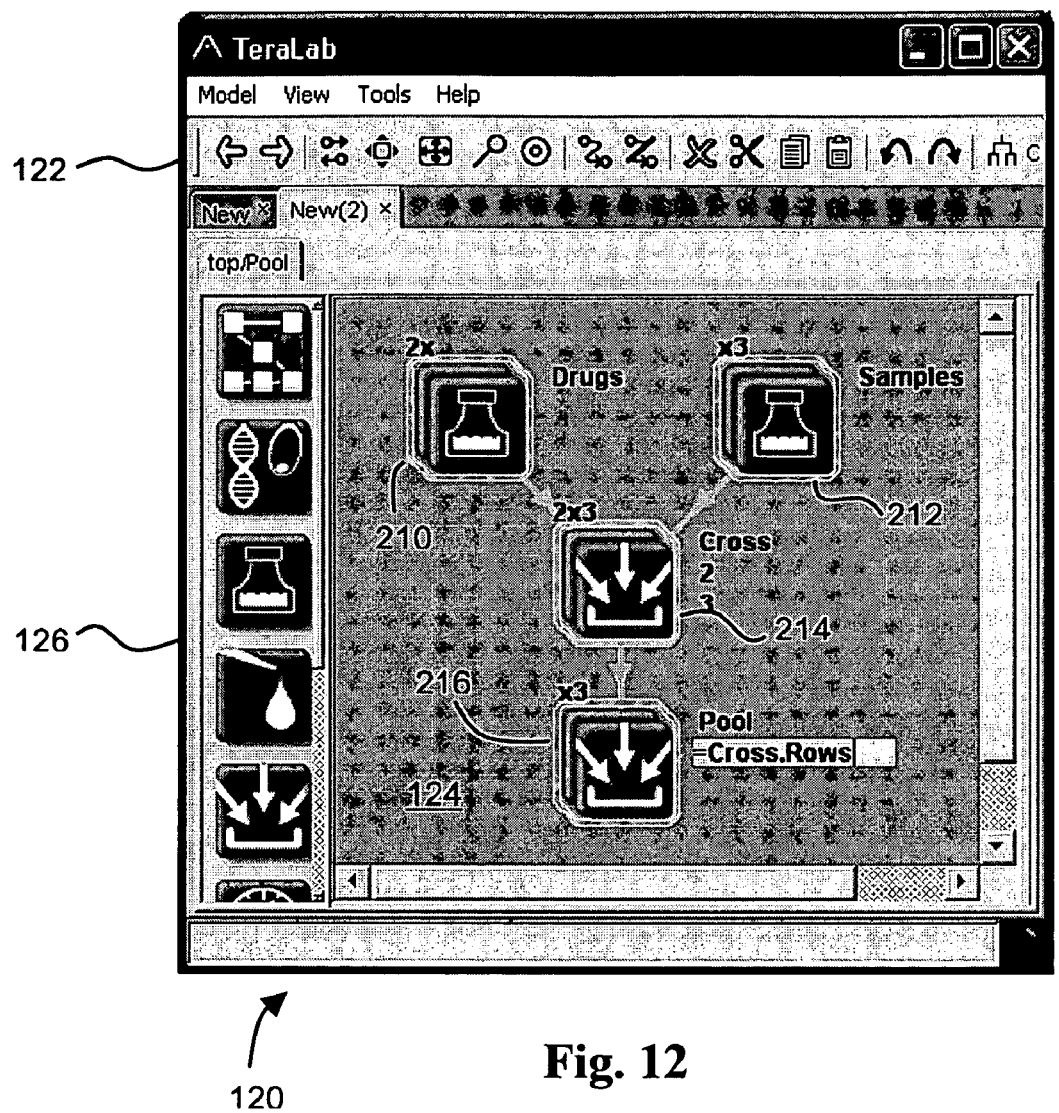
FIG. 12 is a screenshot of a user interface of an adaptive workflow tool according to at least one illustrated embodiment, illustrating an exemplary template setting up of a pooling function.
Figure 13:
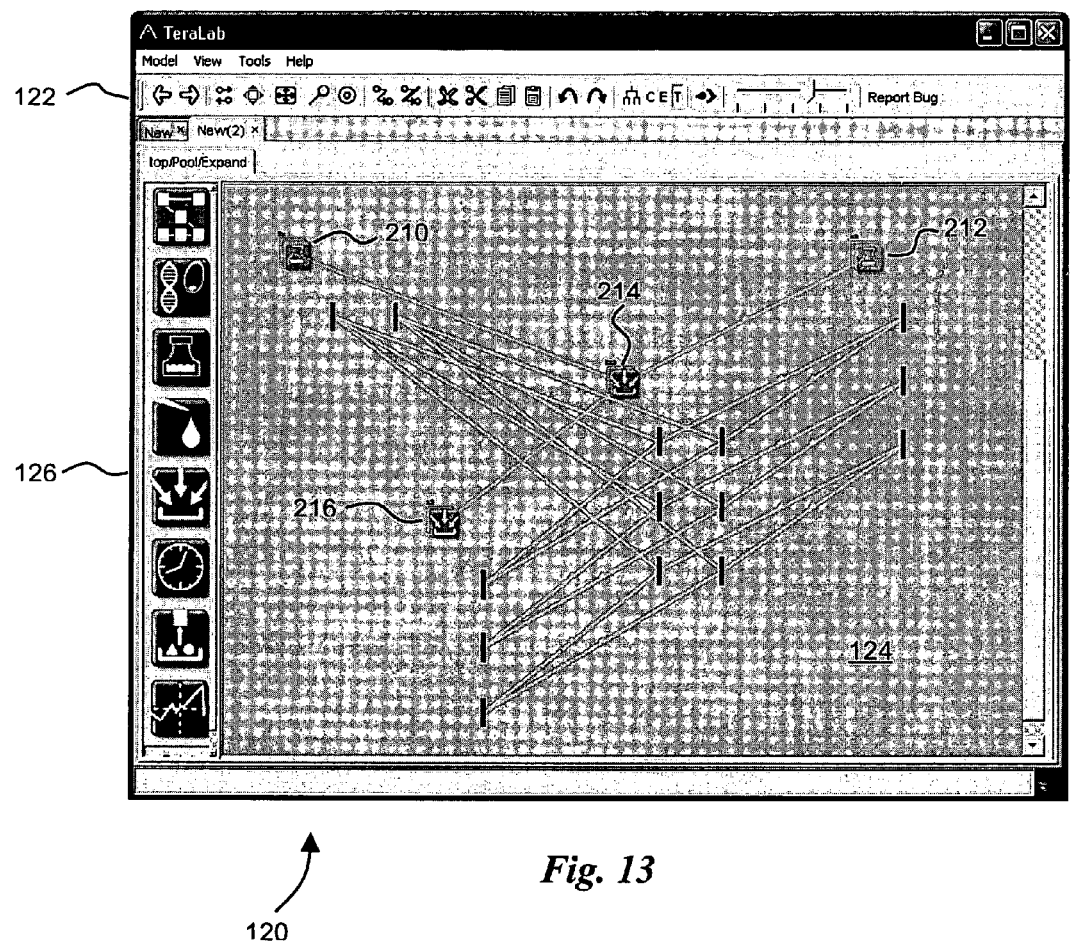
FIG. 13 is a screenshot of a user interface of an adaptive workflow tool according to at least one illustrated embodiment, illustrating an exemplary after performing the pooling function.

FIGS. 12 and 13 show how to setup and the results of a "Pooling" experiment. One example of the goal of pooling is to connect all of the members of a Row or Column to a single combine operations. If one pools across Columns then the resulting batch should not have a Columns axis, only Rows. In particular, FIG. 12 shows the set up of the pooling example. A "Drug" icon 210 represents the drugs, a "Sample" icon 212 represents the samples, a "Cross" icon 214 represents a cross operation and a "Pool" icon 216 represents the pooling operation. The template shown in FIG. 12 will force the AutoFill algorithm to produced the desired pooling, shown in FIG. 13. This works because a member of the Pool batch with index ,x will match all members of the a 2D batch in Row x. Each row of the 2D Cross product in FIG. 12 is pooled into single combine operation. The resulting batch should be one-dimensional, having the same number of Rows as the Cross_Product batch.

FIG. 13 shows the resulting connectivity generated by running the AutoFill algorithm to complete the Pooling example of FIG. 12. The material flow shows the cross structure followed by pooling across Rows to eliminate the Columns.

Selection

Figure 14:
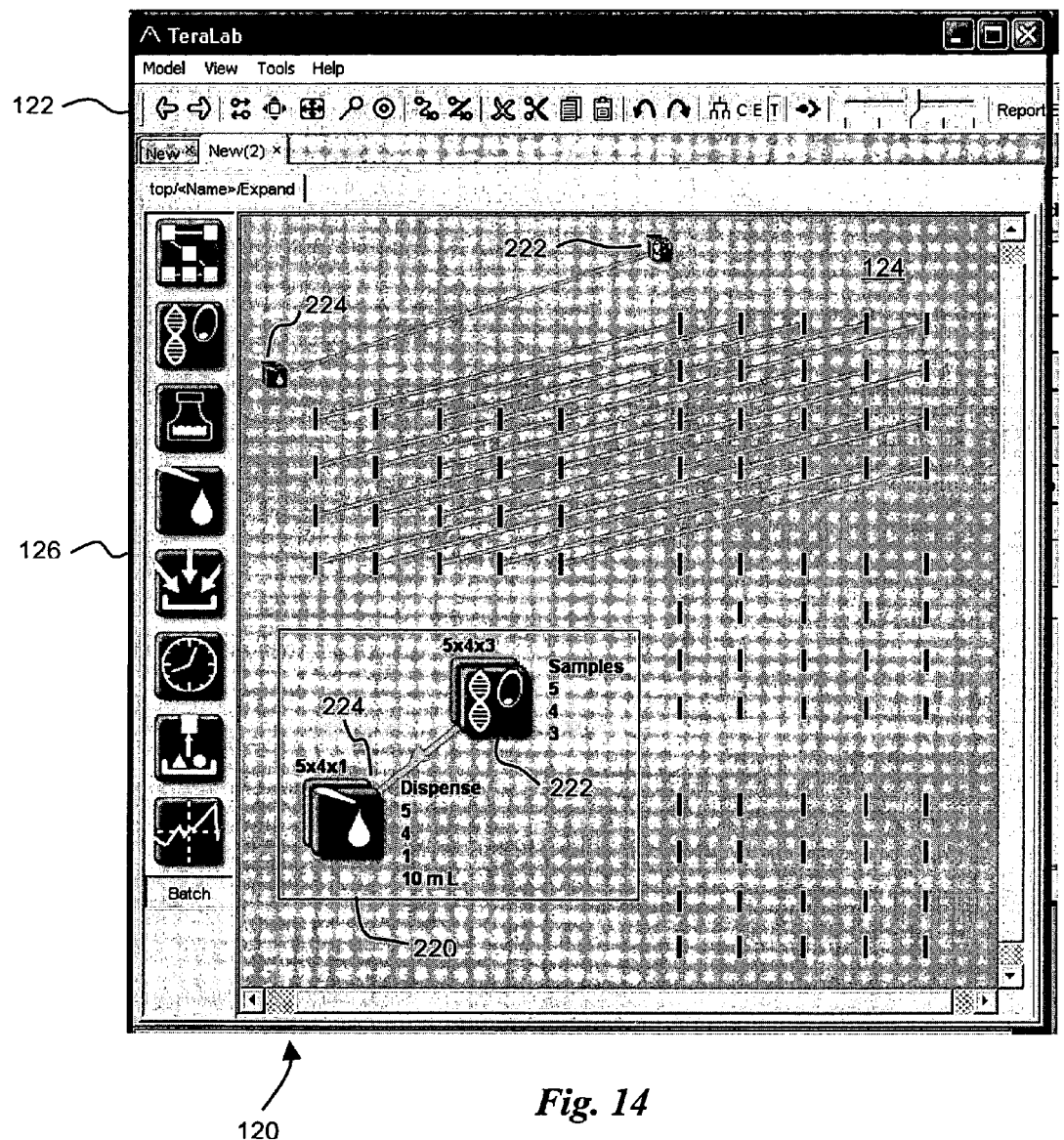
FIG. 14 is a screenshot of a user interface of an adaptive workflow tool according to at least one illustrated embodiment, illustrating an exemplary template showing a select function.

FIG. 14 shows a select procedure. A common requirement is to perform a procedure on subset of a given set of samples. This can be accomplished with the AutoFill algorithm by specifying a subset of the axes of interest. By keeping the dimensionality the same, no pooling will occur. In the example of FIG. 14, the Plate dimension of the Dispense batch is specified as a sub-range of the Plate dimension for the original batch of samples. As a consequence, the AutoFill algorithm only connects members of the Dispense batch to members of the original batch where the Index exactly matches.

FIG. 14. Select. This configuration selects the $1^{st}$ plate out of 3 plates in a 5×4×3 batch. The inset 220 shows the input required by the user prior to running the AutoFill algorithm. A samples icon 222 represents the samples and a dispense icon 224 represents the dispense operation. The dimension "5×4×1" indicates dimension size only. The actual plate or plates that are selected is determined by way the coordinate system for the dispense batch is specified by the user. For example if Plate were specified as "2,3"instead of "1", then the dimension size would be 5×4×2 and the AutoFill algorithm would match to the $2^{nd}$ and $3^{rd}$ plate instead of the $1^{st}$.

Transpose

Figure 15:
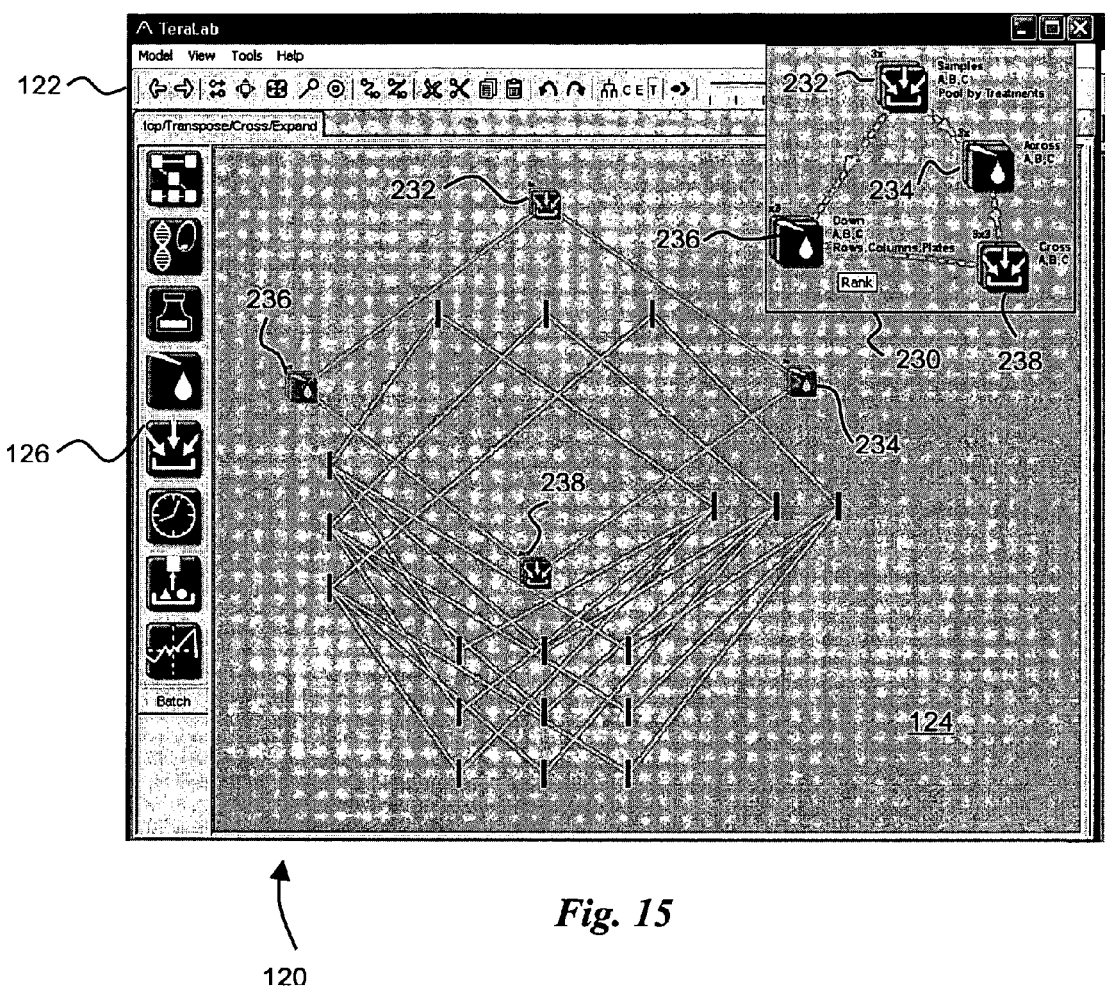
FIG. 15 is a screenshot of a user interface of an adaptive workflow tool according to at least one illustrated embodiment, illustrating an exemplary template setting up of a transpose function.

FIG. 15 illustrates a transpose procedure. Sometimes it is useful to change the way a batch is arranged. An example is the case in which one needs to produce all possible combinations from within a single batch. This can be accomplished by the cross pattern describe above only if the original sample can be split into two batches (Dispense operations) where one of the batches is arranged along the Rows axis and the other is arranged along the Columns axis. The AutoFill algorithm can be used to accomplish this task if we can issue a directive that, for one of the batches, the Axis order should be altered. Using a Rank property forces the AutoFill algorithm to match according to a different order only for the associated batch. As a consequence, member x in the original Sample batch will match to member, x in the transposed Dispense batch (Down). FIG. 15 shows how this pattern can be used to cross a batch of samples with itself.

The inset 230 shows how a single one-dimensional batch can be split, then transposed so that it can be combined with itself in a Cross procedure, as shown in FIGS. 10 and 11. A samples icon 232 represents the samples, an "Across" icon 234 represents an across operation, a "Down" icon 236 represents a down operation, and a "Cross" icon 238 represents a cross operation. The default ordering of the coordinate system, used by the matching algorithm, is overridden by a "Rank" property that specifies a new order {Row, Column, Plate} instead of {Column, Row, Plate}. As a consequence, the AutoFill algorithm will match the Rows of the "Down" batch to the columns of the "Samples" batch so that the "Down" can be crossed with "Across" to form a 2-D batch of all possible combinations.

A variety of other useful patterns can be constructed with the AutoFill algorithm, particularly if other directives are added, such as offsets and strides so that the match algorithm can be shifted or stretched along various dimensions.

AutoFill Algorithm Extension

This extension to the AutoFill algorithm generalizes the class of structures that can be automatically generated to include virtually any pattern that can be expressed mathematically. From very terse, high level specifications, the AutoFill algorithm, with this extension, can generate models for complex combinatorial procedures and computations in a multi-dimensional space.

The general AutoFill algorithm discussed above connects members of connected batches that match at each index position, where empty positions match any entry or other empty entries. This algorithm also works for operations that are not contained in a batch, but which are connected to a batch by an edge. Since such operations do not have Index properties, they match all of the Index properties of the connected Batch members. This is useful for connecting a single operation to every member of a batch.

An extension to this algorithm applies a user defined transformation to G.Index.e prior to evaluating for matches. So, the new algorithm can be written as follows, with the changes from the generalized algorithm emphasized in bold:

For All nodes F and G in the SFG, such that:
F is a node in Batch A; and
G is a node in Batch B; and
F!=G; and
There exists a template edge from A to B Create a new edge from F to G if and only if For all i,
Index x=Transform(G.Index.e)
F.Index.e$_i$=x$_i$ "Entry i of F's Index=Entry i of G's transformed index"; or
F.Index.e$_i$ is empty; or
x$_i$ is empty The transformation can be any mathematical function that produces an index. The transformation can be a function of an Index, as well as any other variable in the model namespace as explained in U.S. Provisional Application No. 60/454,756, filed Mar. 14, 2003. The transformation function can be expressed by users as a set of expressions, one for each dimension in the coordinate system. These expressions will be referred as Match Rules, and we refer to this AutoFill extension as the MatchRule extension.

Figure 16:
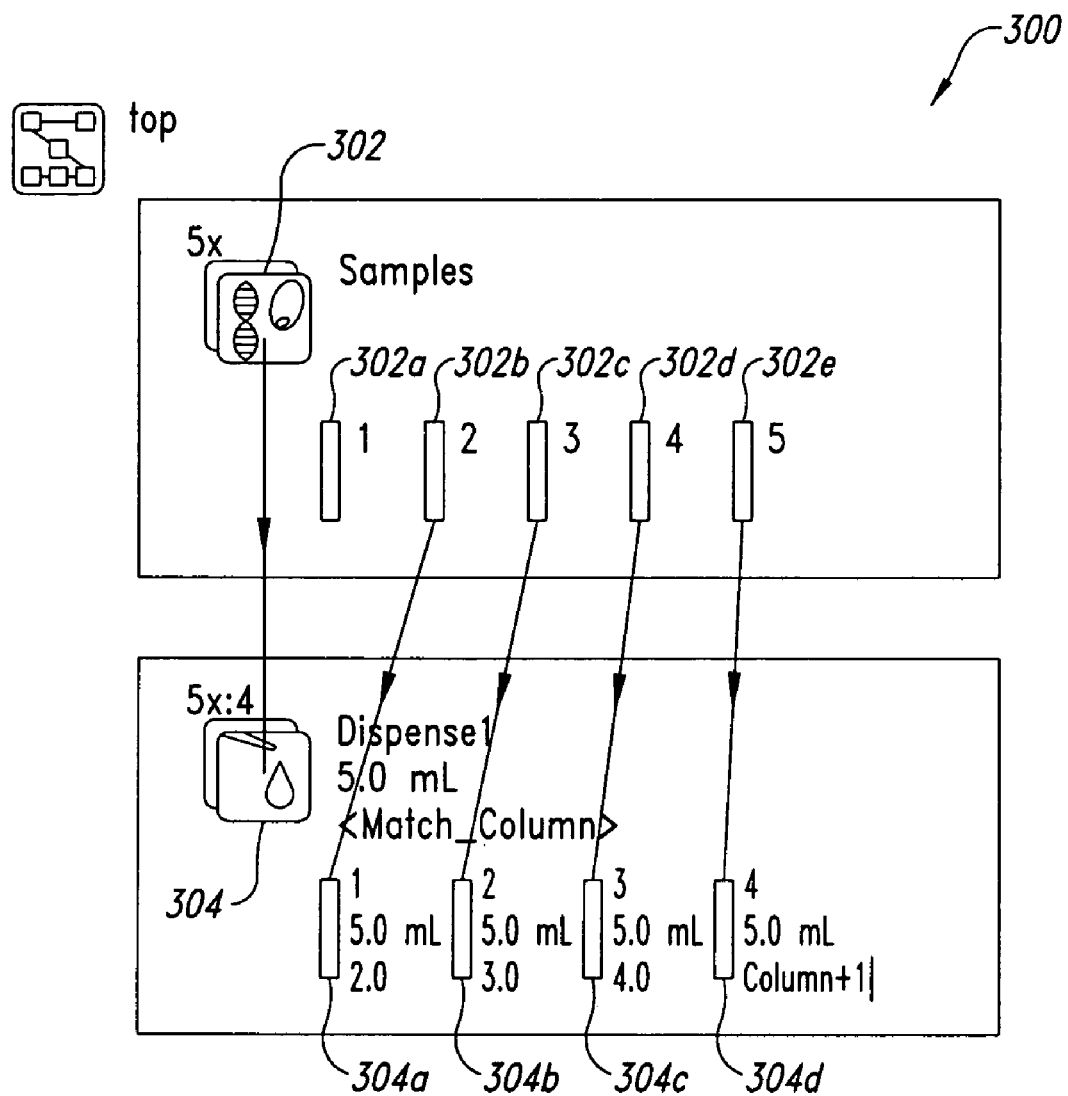
FIG. 16 is a diagrammatic illustration of a sample flow graph for a exemplary procedure of generating models for complex combinatorial procedures and computations in a multi-dimensional space using an adaptive workflow model which shifts connections between Samples and Dispense operations, according to at least one illustrated embodiment.

FIG. 16 shows an simple example of SFG 200 resulting from a match rule that causes the AutoFill algorithm to shift the connections between Samples 302 and Dispense1 304. The Column match rule illustrated by FIG. 16 is independently evaluated for each member 304a–304d of the Dispense1 304 batch prior to application of the AutoFill algorithm. Adding 1 to each member's 304a–304d column position shifts the connections to the left. For example, the fourth member 304d in Dispense1 304 is connected to the fifth member number 302e in the Samples 302. Note also that Dispense1 304 contains only 4 members. The AutoFill algorithm automatically eliminates any members that have no matches.

Figure 17:
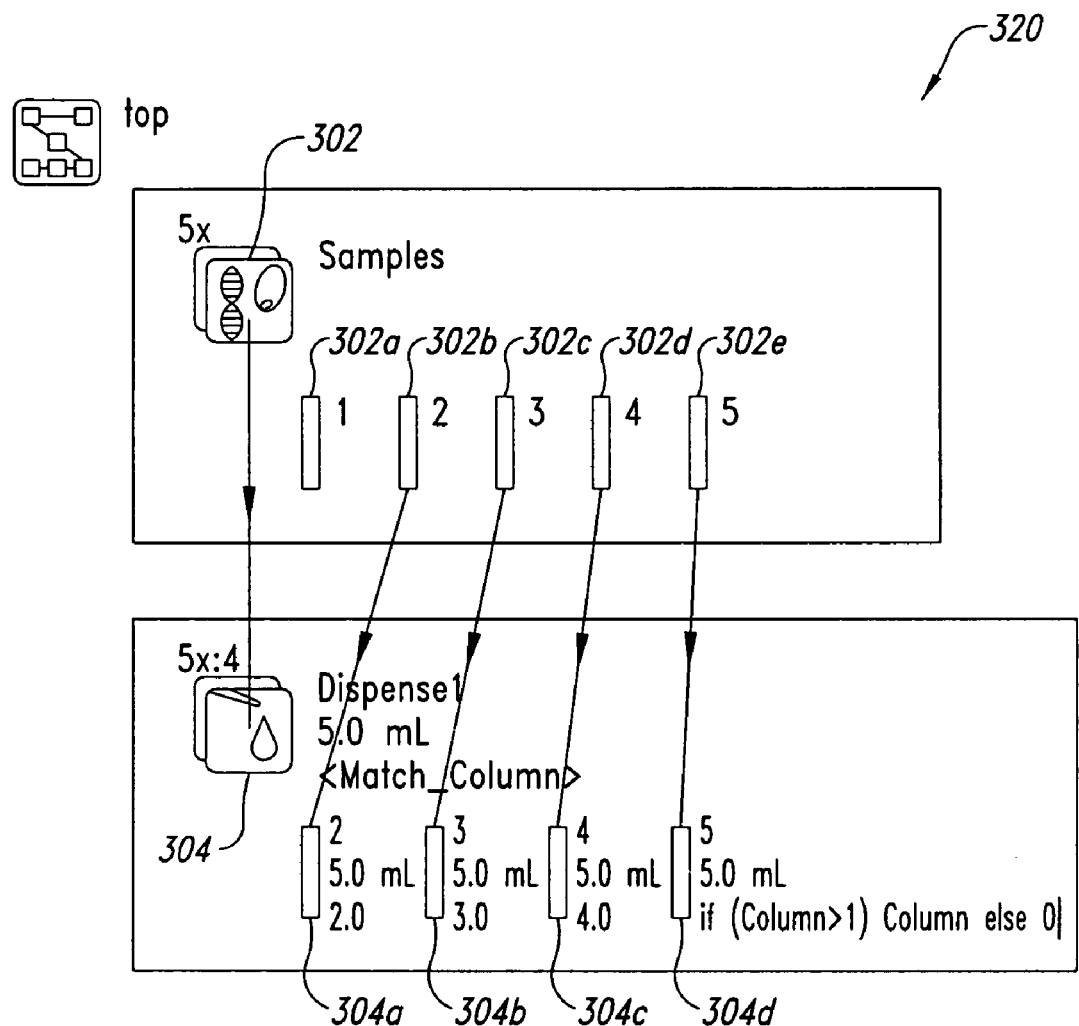
FIG. 17 is a diagrammatic illustration of a sample flow graph for a exemplary procedure represented with an adaptive workflow model similar to that of FIG. 16 however with no shifting of connections, according to at least one illustrated embodiment.

A slight modification to the match rule is illustrated by the SFG 320 of FIG. 17, which produces a similar four member result, but with no shifting. In FIG. 17, a conditional expression in the column match rule is used to ensure that nothing will match for Column 0, leaving the other positions unaffected. There is no shifting in this case.

Figure 18:
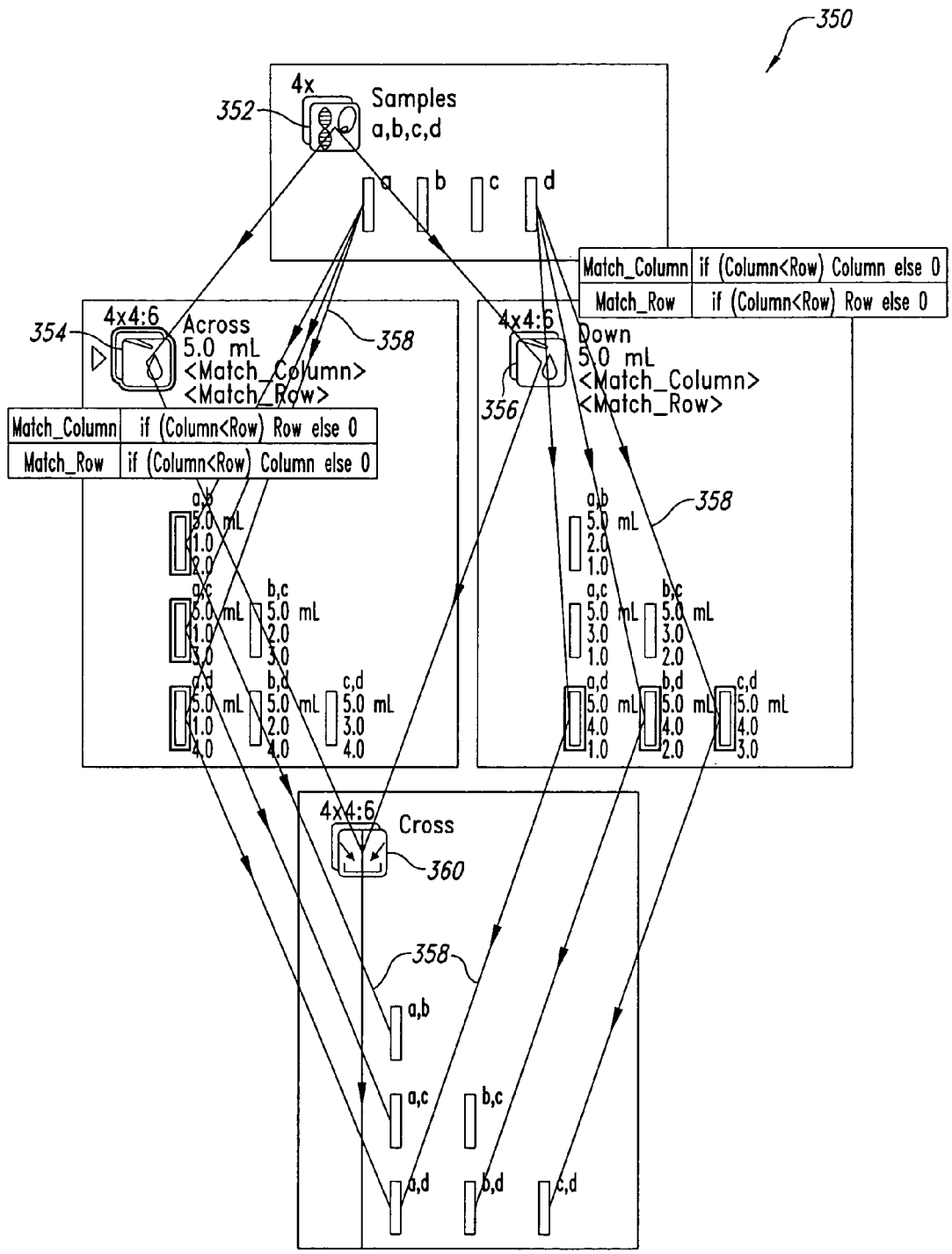
FIG. 18 is a diagrammatic illustration of a sample flow graph for an exemplary procedure represented with an adaptive workflow model employing match rules to simultaneously transpose the original sample set and prevent the creation of duplicate pairings, resulting in the desired lower or upper triangular matrix according to at least one illustrated embodiment.

FIG. 18 presents a more sophisticated example to illustrating the power of the AutoFill algorithm and the MatchRule extension to generate useful structures as represented by the SFG 350. For statistical purposes, it may sometimes be necessary to perform an experiment on a set of samples 352 using all possible combinations for a set of reagents 354. The AutoFill algorithm and the MatchRule extension can be used to easily generate the exact graph representation 350 of such an experiment.

The example of FIG. 18 shows how the match rules can simultaneously transpose the original sample set or batch 352 to prevent the creation of duplicate pairings, resulting in the desired lower or upper triangular matrix. This example is similar to that illustrated in FIG. 15, in that the original sample 352 is split into two batches (Dispense operations Across 354 and Down 356), where one of the batches is arranged along the Rows axis and the other is arranged along the Columns axis. The prevention of duplicate pairs is accomplished for the Across batch 354 by preventing any matches when Column is greater than or equal to the Row, and by transposing Row and Column index positions prior to checking for a match. The dark lines 358 between selected icons highlight some of the connections that were generated by AutoFill. Note that the index for items in the Cross batch 360 correctly indicate how they are related to the original Samples batch 352. This is a natural consequence of the AutoFill algorithm and automatic coordinate system propagation from batch to batch along the connections defined by the user at the batch level.

AutoFill Algorithm Extension for Manual Override

In the AutoFill algorithm discussed generally above, all of the connections between members of batches in the flow graph were determined by the algorithm. These results could be modified by the user after running the algorithm to obtain a combination of automatic and manual connections. However, this approach is not suitable for a dynamic implementation in which the algorithm continuously re-executed as batch sizes and match rules are changed. In a dynamic implementation, manual alterations to the AutoFill results would be obliterated by the next execution. To solve this problem, the following sets out a novel method for preserving manual edits in the model in a way that influences the results of future executions of the AutoFill algorithm. The modeling extensions and modification to the AutoFill algorithm are described below.

Figure 19:
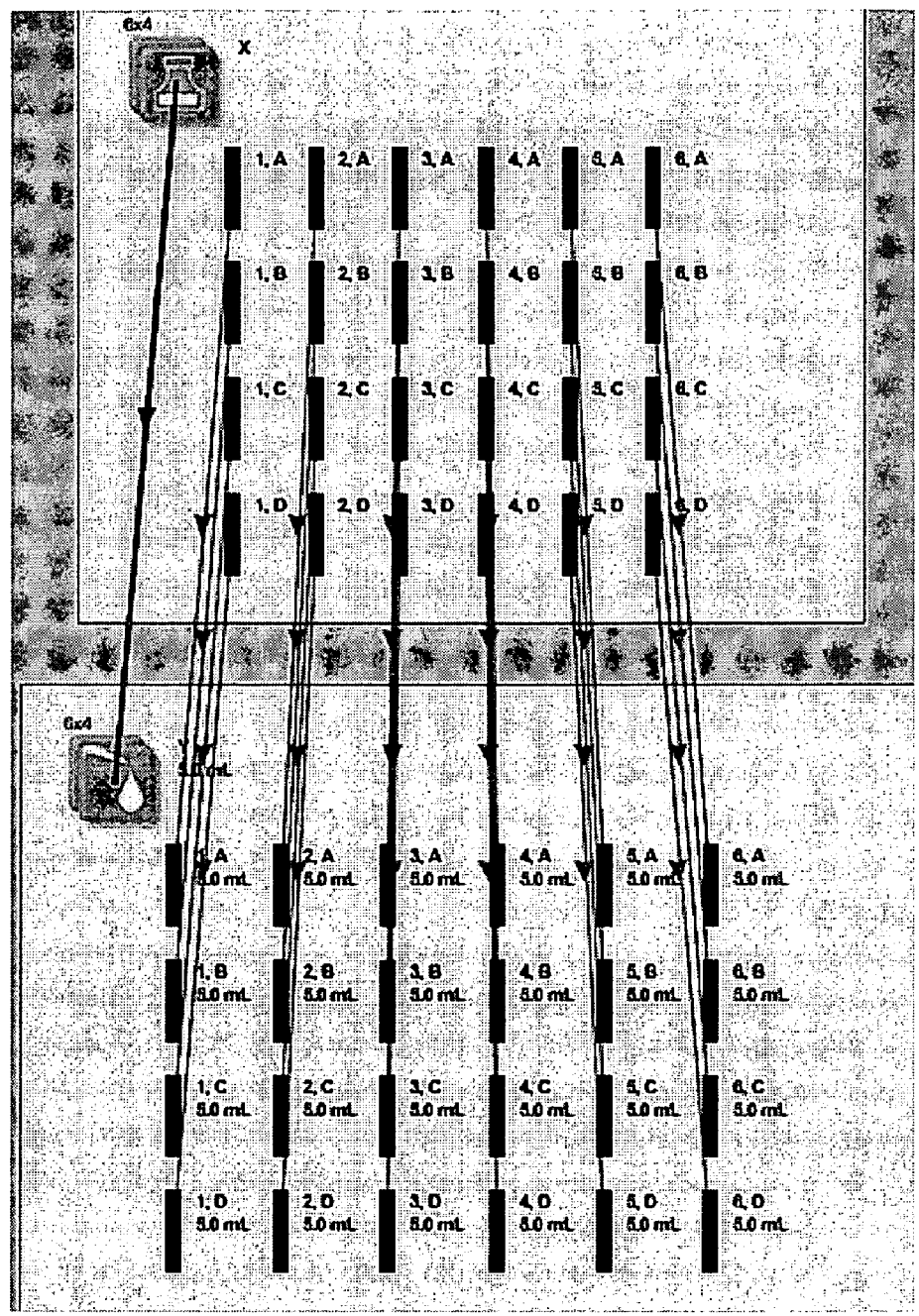
FIG. 19 is a diagrammatic illustration of a sample flow graph for a an exemplary procedure connecting a Batch X with a Batch Y according to one illustrated embodiment.

In FIG. 19, Batch X is connected to Batch Y. As a consequence, each member of Batch X is automatically connected to each member of Batch Y by an "automatic" connection according to the AutoFill algorithm.

In the original system, if the user wanted to eliminate a connection, for example, between 1,A in batch X and 1,A in batch Y, the user could have deleted the "automatic" connection between them. Re-execution of the AutoFill algorithm would, however, restore this deleted connection, contrary to the intent of the user.

To support a dynamic user interface, in which the automatic connections are recomputed when parameters such as batch sizes and match rules are changed, a method is needed that preserves manual alterations. There are two possible types of manual alterations: deletion of an "automatic" edge (i.e., deletion) and addition (i.e., addition) of an edge that would not have been created by the AutoFill algorithm.

Figure 20:
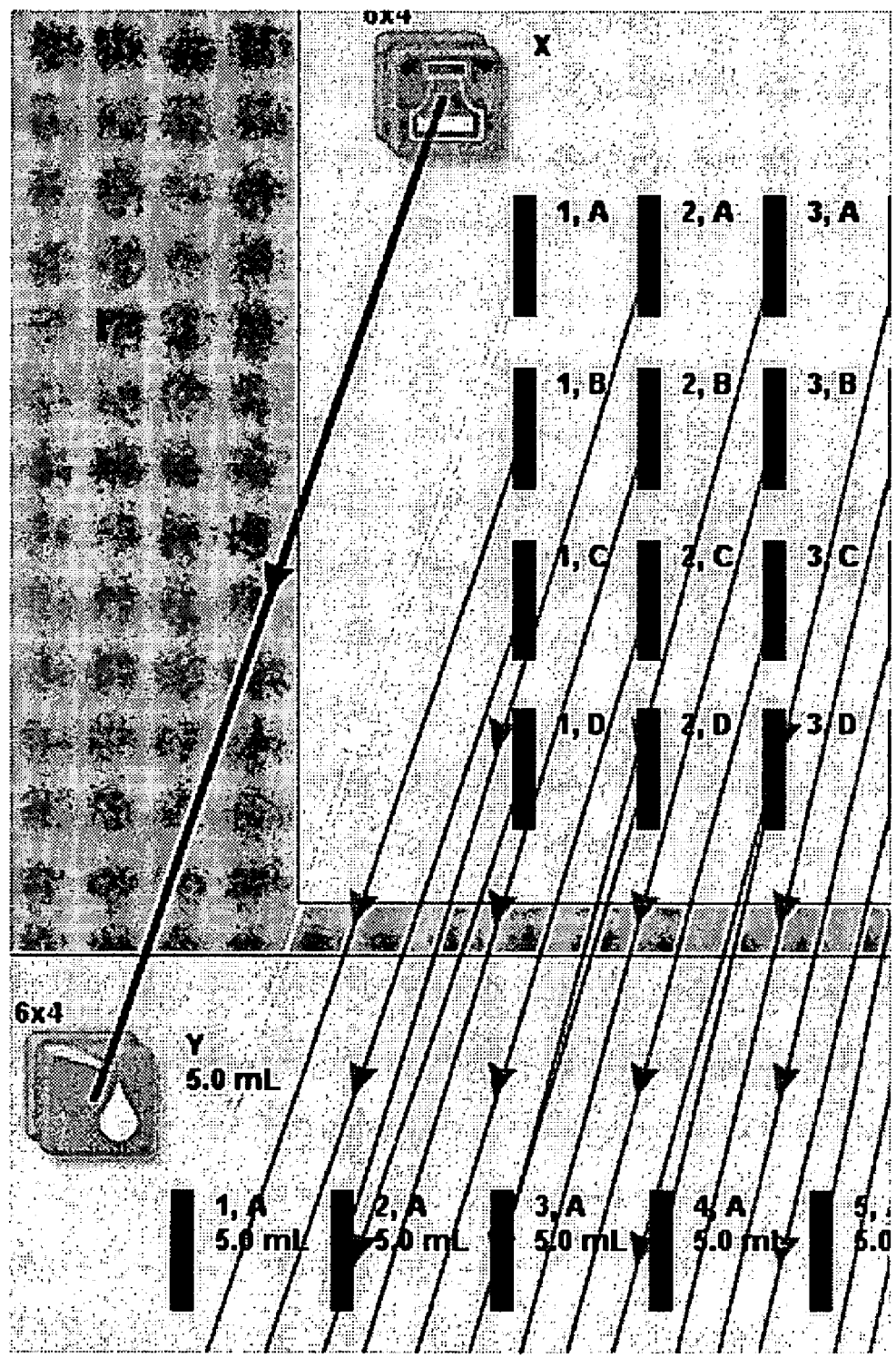
FIG. 20 is a diagrammatic illustration of a sample flow graph for a an exemplary procedure illustrating a deletion operation by the addition of a NoConnect edge for modifying the Batch X and Batch Y operation illustrated in FIG. 19, according to one illustrated embodiment.

In the new implementation, the deletion of an "automatic" edge is made permanent by adding a "NoConnect" edge between in its place. This "NoConnect" edge is respected by the new autofill algorithm, so an automatic edge is not created. The NocConnect edge is shown in white in FIG. 20

Though this NoConnect edge could be made invisible to the user, it may be preferable to make the NoConnect edge visible so that the user will know to delete the NoConnect edge if they wish to restore the automatic connection.

Figure 21:
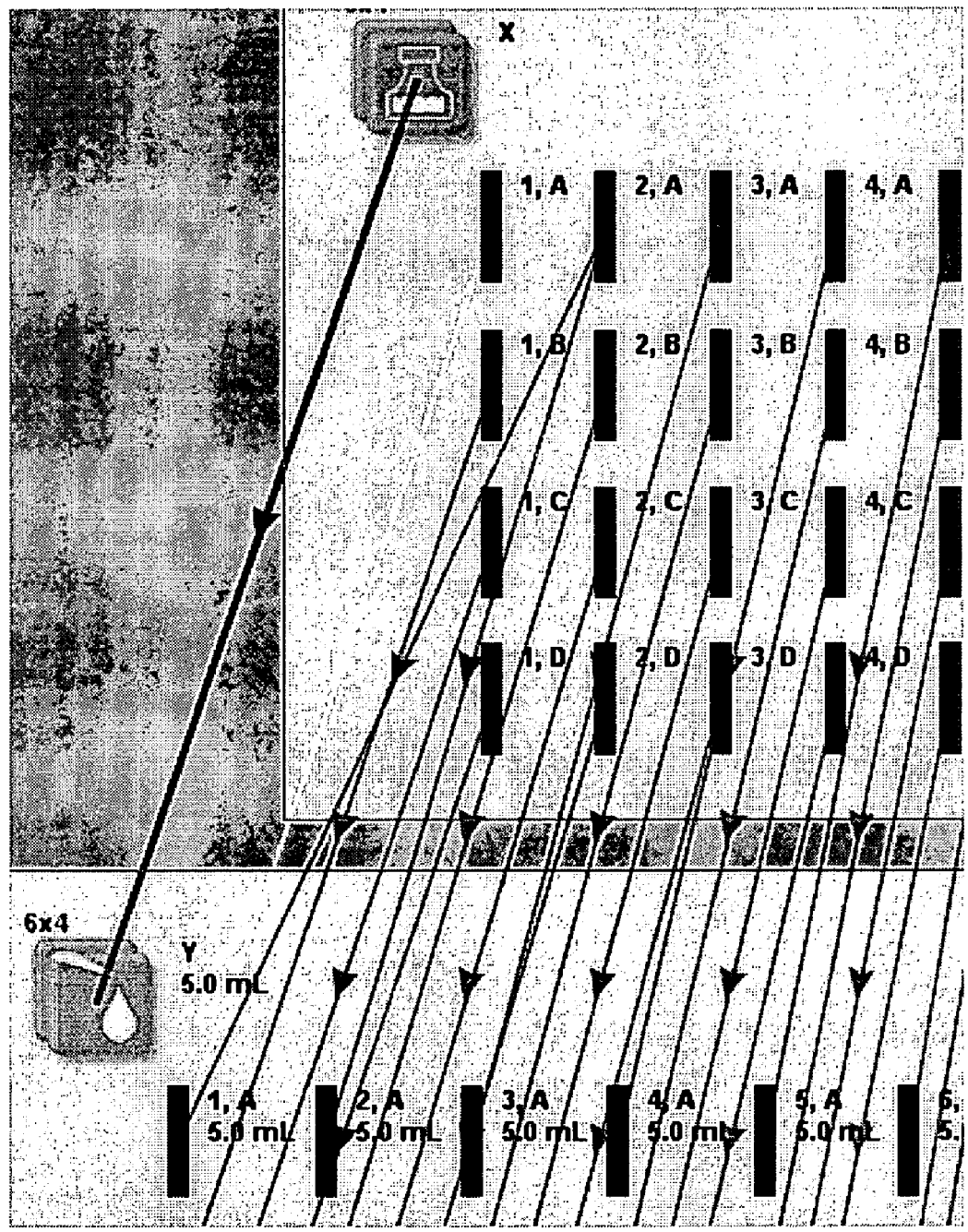
FIG. 21 is a diagrammatic illustration of a sample flow graph for a an exemplary procedure illustrating an addition of a manual connection between a pair of elements represented by icons in the Batch X and Batch Y operation illustrated in FIG. 19, according to one illustrated embodiment.

To preserve manual connections, only automatic connections are deleted prior to re-execution of the AutoFill algorithm. FIG. 21 shows the results of adding a manual connection between 2,A in X and 1,A in Y.

The dynamic AutoFill implementation can be summarized in the following pseudo-code specification:

When a change to a batch size or match rule is detected do {
  Delete all connections marked "automatic" that involve the changed batch
  Compute automatic connection set using the extended match rule algorithm
  Delete all automatic connections that conflict with NoConnect edges
  Mark all automatic connections as "automatic"}

One of the benefits of this enhancement to the AutoFill algorithm is that ability to present a dynamic, continuously updated detailed model to the user based on match rules and batch connection structure, while still allowing users to selectively override the AutoFill results. One of the benefits of the AutoFill algorithm is its ability to generate virtually any mathematically describable connection pattern between members of batches (n-dimensional arrays). Though irregular structures can be constructed using match rules with discontinuous functions (if-then-else expressions) it is far more efficient and direct to allow the users simply draw in the irregular portions of the pattern in cooperation with the AutoFill algorithm. This is accomplished by supporting additions and deletions of connections that are preserved during re-execution of the AutoFill algorithm. These additions and deletions can be added and removed using the same connection and disconnection user interface that is used for all other connections in the system.

Other Applications

The above examples are for illustrated in terms of laboratory procedures, but are equally applicable to pure mathematical modeling and computation. As an example, Batches and automatically generated connections can be used to produce spatial and temporal models of biological systems. Each element in the batch would correspond to a reaction or concentrations of chemical species, with edges corresponding to chemical fluxes in and out of the reactions resulting in changes to species concentrations. The AutoFill algorithm and MatchRule extension enables users to rapidly generate complex finite element models of such systems, or other computational systems, with a simple iconic representation.

Those skilled in the relevant art can readily create source based on FIGS. 2–18 and the detailed description provided herein.

Although specific embodiments of and examples for the apparatus and method of the auto-filling in workflow modeling are described herein for illustrative purposes, various equivalent modifications can be made without departing from the spirit and scope of the invention, as will be recognized by those skilled in the relevant art. The teachings provided herein of the invention can be applied to other processor controlled systems, not necessarily the exemplary computing system generally described above. Likewise, the teachings provided herein of the invention can be applied to other workflow modeling tools, not necessarily the exemplary workflow modeling tool generally described above The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. provisional patent applications Ser. No. 60/454,756, filed Mar. 14, 2003, and entitled "METHOD, APPARATUS AND ARTICLE FOR GRAPHICAL MANIPULATION OF WORKFLOW USING EQUATIONS"; Ser. No. 60/493,749, filed Aug. 8, 2003, and entitled "BATCH-BASED METHOD AND TOOL FOR GRAPHICAL MANIPULATION OF WORKFLOWS"; Ser. No. 60/505,096, filed Sep. 22, 2003, and entitled "BATCH-BASED METHOD AND TOOL FOR GRAPHICAL MANIPULATION OF WORKFLOWS"; Ser. No. 60/543,859, filed Feb. 11, 2004, and entitled "BATCH-BASED METHOD AND TOOL FOR GRAPHICAL MANIPULATION OF WORKFLOWS"; Ser. No. 60/493,748, filed Aug. 8, 2003, and entitled "CLOSED LOOP INTEGRATION OF IN SILICO AND PHYSCAL MODELING"; and Ser. No. 60/508,109, filed Oct. 2, 2003, and entitled "CLOSED LOOP INTEGRATION OF IN SILICO AND PHYSCIAL MODELING"; are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all batch-based procedure design that operated in accordance with the claims. Accordingly, the invention is not limited by the disclosure, but instead its scope is to be determined entirely by the following claims.

What is claimed is:

1. A method executing on a processor employing digital models of flow processes, the method comprising: creating digital representations creating digital representations of at least two hierarchical nodes, each of the hierarchical nodes having associated therewith a respective dimensionality defining a number of dimensions of the respective hierarchical node, the respective dimensions of each of the hierarchical nodes having a defined order with respect to one another, each dimension having an associated size defining a number of members of the respective dimension; creating digital representations of a number of hierarchical edges defining connections between at least some of the hierarchical nodes, at least a first one of the hierarchical edges defining a connection between a first and a second one of the at least two hierarchical nodes; and for each of a number of pairs of hierarchical nodes connected by a respective shared one of the hierarchical edges, associating at least one of a number of match rules with the pair of hierarchical nodes, each of the match rules defining at least one matrix transformation between the hierarchical nodes of the respective pair, application of the matrix transformation to the members of the hierarchical nodes of the respective pair defining a resulting set of primitive nodes and primitive edges, where a first one of the number of match rules defines a first matrix transformation between the first and the second hierarchical nodes.

2. The method of claim 1, further comprising:
  receiving a first set of user inputs identifying selection of a first icon representing a first hierarchical node of the at least two hierarchical nodes, and identifying a dimensionality indicating a total number of dimensions for the first hierarchical node and a size of each of the respective dimensions; and
  receiving a second set of user inputs identifying selection of a first icon representing a second hierarchical node of the at least two hierarchical nodes, and identifying a dimensionality indicating a total number of dimensions for the second hierarchical node and a size of each of the respective dimensions.

3. The method of claim 2, further comprising:
receiving a third set of user inputs identifying a first icon representing an edge extending from the first to the second hierarchical nodes.

4. The method of claim 1, further comprising:
receiving a first set of user inputs identifying selection of a first icon representing the first hierarchical node of the at least two hierarchical nodes, a human-readable name of the first hierarchical node, and identifying the dimensionality indicating the total number of dimensions for the first hierarchical node, the size of each of the respective dimensions and a human-readable name for each of the dimensions.

5. The method of claim 1, further comprising:
receiving a first set of user inputs identifying selection of a first icon representing the first hierarchical node of the at least two hierarchical nodes, a human-readable name of the first hierarchical node, and identifying the dimensionality indicating the total number of dimensions for the first hierarchical node, and the order of the dimensions with respect to one another, and a size of each of the respective dimensions.

6. The method of claim 1, further comprising:
for each of the hierarchical nodes, automatically creating digital representations of a number of primitive nodes to fill in the respective dimensions, based on the number of dimensions and the size of each of the dimensions of the respective hierarchical node.

7. The method of claim 6, further comprising:
for each pair of hierarchical nodes connected by a respective shared one of the hierarchical edges, automatically creating digital representations of primitive edges between primitive nodes based on the matrix transformation defined by the match rule associated with the respective pair of hierarchical nodes.

8. The method of claim 7, further comprising:
detecting a change to at least one of the hierarchical nodes or at least one of the hierarchical edges; and
in response to the detected change, for each of the hierarchical nodes, automatically recreating digital representations of the number of primitive nodes to fill in the respective dimensions, based on the number of dimensions and the size of each of the dimensions of the respective one of the hierarchical nodes.

9. The method of claim 7, further comprising:
detecting a change to at least one of the hierarchical nodes or at least one of the hierarchical edges; and
in response to the detected change, for each of the hierarchical nodes, automatically recreating digital representations of the number of primitive nodes to fill in the respective dimensions, based on the number of dimensions and the size of each of the dimensions of the respective one of the hierarchical nodes and automatically recreating digital representations of primitive edges between primitive nodes based on the matrix transformation defined by the match rule associated with the respective pair of hierarchical nodes.

10. The method of claim 9, further comprising:
determining that a user has directed suppression of application of at least one of the match rules to at least one of the primitive nodes or at least one of the primitive edges; and
selectively suppressing of the recreating of at least one of the primitive nodes or at least one of the primitive edges based on user directed suppression of the at least one match rule to the at least one of the primitive nodes or at least one of the primitive edges.

11. The method of claim 1, further comprising:
producing a visual representation the primitive nodes and primitive edges.

12. The method of claim 11, further comprising:
producing a number of transducer drive signals corresponding to at least some of the primitive nodes and some of the primitive edges for driving a number of transducers.

13. A system for modeling highly parallel processes that operate on materials or data in which parallel paths undergo reorganizations such as combinations, and, or splitting, the system comprising:
a processor;
a computer-readable memory storing instructions executable by the processor comprising,
a first set of instructions for creating digital representations of at least two hierarchical nodes, each of the hierarchical nodes having associated therewith a respective dimensionality defining a number of dimensions of the respective hierarchical node, the respective dimensions of each of the hierarchical nodes having a defined order with respect to one another, each dimension having an associated size defining a number of members of the respective dimension;
a second set of instructions for creating digital representations of a number of hierarchical edges defining connections between at least some of the hierarchical nodes, at least a first one of the hierarchical edges defining a connection between a first and a second one of the at least two hierarchical nodes; and
a third set of instructions means for associating at least one of a number of match rules with a pair of hierarchical nodes for each of a number of pairs of hierarchical nodes connected by a respective shared one of the hierarchical edges, each of the match rules defining at least one matrix transformation between the hierarchical nodes of the respective pair, application of the matrix transformation to the members of the hierarchical nodes of the respective pair defining a resulting set of primitive nodes and primitive edges, where a first one of the number of match rules defines a first matrix transformation between the first and the second hierarchical nodes.

14. The system of claim 13, further comprising:
a display coupled to the processor and operable to display the hierarchical nodes, the hierarchical edges, and the primitive nodes and the primitive edges.

15. The system of claim 13, further comprising:
an output port couplable to provide control signals to one or more robotic devices.

16. A computer-readable medium storing a data structure representing flow processes, the data structure comprising:
at least two hierarchical nodes, each of the hierarchical nodes having associated therewith a respective dimensionality defining a number of dimensions of the respective hierarchical node, the respective dimensions of each of the hierarchical nodes having a defined order with respect to one another, each dimension having an associated size defining a number of members of the respective dimension;
a number of hierarchical edges defining connections between at least some of the hierarchical nodes, at least a first one of the hierarchical edges defining a connection between a first and a second one of the at least two hierarchical nodes; and a number of match rules, each of the match rules defining at least one matrix transformation between a respective pair of hierarchical nodes connected by a common one of the hierarchical edges, application of the matrix transformation to the members of the hierarchical nodes of the respective pair of hierarchical nodes define a resulting set of primitive nodes and primitive edges, at least a first one of the number of match rules defining a first matrix transformation between the first and the second hierarchical nodes.

17. The computer-readable medium of claim 16 wherein each member represents a primitive operation or a primitive material.

18. The computer-readable medium of claim 16 wherein each member represents a primitive piece of information.

19. The computer-readable medium of claim 16 wherein each member represents one of a primitive operation, a primitive material, or another hierarchical node.

20. The computer-readable medium of claim 16 wherein the members are ordered along the dimension.

21. The computer-readable medium of claim 16 wherein the dimensionality of at least one of the first and the second hierarchical nodes is three and the dimensions correspond to an X-axis, a Y-axis perpendicular to the X-axis, and a Z-axis perpendicular to both the X-axis and the Y-axis.

22. The computer-readable medium of claim 16 wherein the dimensionality of at least one of the first and the second hierarchical nodes is two and the dimensions correspond to a row and a column perpendicular to the row.

23. A method executing on a processor employing high level constructs in the form of hierarchical nodes and hierarchical edges defining directed connections between the hierarchical nodes to represent low level details of a process flow in the form of primitive nodes and primitive connections between the primitive nodes, the method comprising: for each of a number of hierarchical nodes, automatically creating a number of primitive nodes to at least partially fill at least one Cartesian dimension of the respective one of hierarchical nodes; and automatically creating of a number of primitive edge connections between the automatically created primitive nodes based on a match rule associated with a connected pair the hierarchical nodes, the match rule defining at least one matrix transformation between the hierarchical nodes of the connected pair of hierarchical nodes.

24. The method of claim 23, further comprising:
associating properties with at least some of the primitive nodes, the properties associated with the primitive nodes corresponding to a property assigned to respective dimensions of the hierarchical nodes from which the primitive node is defined via the respective match rule.

25. The method of claim 23 wherein a first hierarchical node corresponds to a first material, a second hierarchical node corresponds to a second material, and a third hierarchical node corresponds to an operation to be performed on the first and the second material, a first edge connects the first hierarchical node to the third hierarchical node and a second edge connects the second hierarchical node to the third hierarchical node.

26. The method of claim 25 wherein automatically creating a number of primitive nodes to at least partially fill at least one Cartesian dimension of the respective one of hierarchical nodes comprises creating a number of primitive nodes representing rows of the first hierarchical node, creating a number of primitive nodes representing columns of the second hierarchical node, and creating a number of rows and columns of primitive nodes representing the third hierarchical node, the number of rows representing the third hierarchical node matching a number of rows in the first hierarchical node and the number of columns representing the third hierarchical node matching a number of columns in the second hierarchical node.

27. The method of claim 26 wherein automatically creating of a number of primitive edge connections between the automatically created primitive nodes based on a match rule associated with a connected pair the hierarchical nodes comprises creating an edge connection from each of a number of primitive node representing respective rows in the first hierarchical node to each of the primitive nodes in a respective row of the third hierarchical node, and creating an edge connection from each of a number of primitive nodes representing respective columns in the second hierarchical node to each of the primitive nodes in a respective column of the third hierarchical node.

* * * * *